United States Patent
Melodia et al.

(10) Patent No.: US 12,192,792 B2
(45) Date of Patent: Jan. 7, 2025

(54) OPERATING SYSTEM FOR SOFTWARE-DEFINED CELLULAR NETWORKS

(71) Applicant: Northeastern University, Boston, MA (US)

(72) Inventors: Tommaso Melodia, Newton, MA (US); Leonardo Bonati, Boston, MA (US); Salvatore D'Oro, Allston, MA (US)

(73) Assignee: Northeastern University, Boston, MA (US)

( * ) Notice: Subject to any disclaimer, the term of this patent is extended or adjusted under 35 U.S.C. 154(b) by 351 days.

(21) Appl. No.: 17/605,266

(22) PCT Filed: May 1, 2020

(86) PCT No.: PCT/US2020/030930
§ 371 (c)(1),
(2) Date: Oct. 21, 2021

(87) PCT Pub. No.: WO2020/223593
PCT Pub. Date: Nov. 5, 2020

(65) Prior Publication Data
US 2022/0248238 A1 Aug. 4, 2022

Related U.S. Application Data

(60) Provisional application No. 62/841,295, filed on May 1, 2019.

(51) Int. Cl.
*H04W 24/02* (2009.01)

(52) U.S. Cl.
CPC .................. *H04W 24/02* (2013.01)

(58) Field of Classification Search
CPC ...................................................... H04W 24/02
See application file for complete search history.

(56) References Cited

U.S. PATENT DOCUMENTS

| | | | |
|---|---|---|---|
| 7,263,496 B1 | 8/2007 | Weigelt et al. | |
| 7,522,908 B2 * | 4/2009 | Hrastar | H04W 24/00 455/457 |

(Continued)

FOREIGN PATENT DOCUMENTS

| | | | |
|---|---|---|---|
| CN | 105792252 B | * | 4/2019 |
| WO | 2019108769 A1 | | 6/2019 |

OTHER PUBLICATIONS

Guan et al., "WNOS: An Optimization-based Wireless Network Operating System", arXiv:1712.08667v1 [cs.NI], 18 pages, Dec. 22, 2017 (Year: 2017).*

(Continued)

*Primary Examiner* — Yuwen Pan
*Assistant Examiner* — Swati Jain
(74) *Attorney, Agent, or Firm* — Verrill Dana, LLP

(57) ABSTRACT

A self-optimizing operating system for next-generation cellular networks is provided. The system provides telecommunications operators with an efficient and flexible network control platform that hides low-level network details through a virtual network abstraction and allows them to define centralized and high-level control objectives with no need for in-depth and detailed knowledge of cross-layer optimization theory or the underlying wireless protocol stack implementation.

21 Claims, 14 Drawing Sheets

(56) References Cited

U.S. PATENT DOCUMENTS

| | | | |
|---|---|---|---|
| 8,271,608 B2* | 9/2012 | Mahaffey | G06F 9/54 |
| | | | 709/219 |
| 8,844,041 B1 | 9/2014 | Kienzle et al. | |
| 11,537,386 B2* | 12/2022 | Sinha | H04L 12/4641 |
| 2005/0007997 A1 | 1/2005 | Morton et al. | |
| 2007/0011437 A1 | 1/2007 | Carnahan | |
| 2007/0111757 A1 | 5/2007 | Cao et al. | |
| 2008/0144562 A1 | 6/2008 | Draper et al. | |
| 2008/0219268 A1 | 9/2008 | Dennison | |
| 2009/0099995 A1 | 4/2009 | Tzeng | |
| 2009/0112784 A1 | 4/2009 | Brun et al. | |
| 2009/0129316 A1 | 5/2009 | Ramanathan et al. | |
| 2010/0192013 A1 | 7/2010 | Krishnan et al. | |
| 2010/0271989 A1 | 10/2010 | Chernoguzov et al. | |
| 2011/0205929 A1 | 8/2011 | Quek et al. | |
| 2012/0005251 A1 | 1/2012 | Xie et al. | |
| 2015/0195126 A1 | 7/2015 | Vasseur et al. | |
| 2015/0312894 A1* | 10/2015 | Chen | H04W 16/18 |
| | | | 370/329 |
| 2016/0156513 A1* | 6/2016 | Zhang | H04W 40/32 |
| | | | 709/220 |
| 2016/0156733 A1 | 6/2016 | Farhadi et al. | |
| 2016/0191306 A1 | 6/2016 | Gasparakis et al. | |
| 2016/0219024 A1 | 7/2016 | Verzun et al. | |
| 2017/0303135 A1* | 10/2017 | Melodia | H04L 5/0098 |
| 2018/0337823 A1* | 11/2018 | Zhang | H04L 67/10 |
| 2018/0343567 A1* | 11/2018 | Ashrafi | H04L 43/20 |
| 2019/0158676 A1* | 5/2019 | Shaw | H04L 12/1403 |
| 2019/0320298 A1* | 10/2019 | Shaw | H04W 12/06 |
| 2020/0259744 A1* | 8/2020 | Dowlatkhah | H04W 24/02 |
| 2020/0280504 A1* | 9/2020 | Melodia | H04L 43/14 |
| 2022/0247678 A1* | 8/2022 | Atwal | H04L 45/645 |
| 2022/0360653 A1* | 11/2022 | Wouhaybi | H04L 67/565 |

OTHER PUBLICATIONS

B. Dezfouli, V. Esmaeelzadeh, J. Sheth and M. Radi, "A Review of Software-Defined WLANs: Architectures and Central Control Mechanisms," in IEEE Communications Surveys & Tutorials, vol. 21, No. 1, pp. 431-463, First quarter 2019. (Year: 2019).*

Zahr, M. J. (2016). Adaptive model reduction to accelerate optimization problems governed by partial differential equations. (Year: 2016).*

H. Ali-Ahmad et al., "CROWD: An SDN Approach for DenseNets," 2013 Second European Workshop on Software Defined Networks, Berlin, Germany, 2013, pp. 25-31. (Year: 2013).*

Abolhasan, M. et al., "Software-Defined Wireless Networking: Centralized, Distributed, or Hybrid?" IEEE Network, ,01. 29, pp. 32-38 , Jul./Aug. 2015 (Year: 2015).*

Guan et al., "WNOS: An Optimization-based Wireless Network Operating System," arXiv:1712.08667v1 [cs.NI], 18 pages, Dec. 22, 2017.

Bansal, M. et al., "OpenRadio: A Programmable Wireless Dataplane," In Proc. of ACM HotSDN. Helsinki, Finland, pp. 109-114, 2012.

Bernardos, C.J. et al., "An Architecture for Software Defined Wireless Networking," IEEE Wireless Communications Magazine 21, 3, pp. 52-61, Jun. 2014.

Bradai, A. et al., "Cellular Software Defined Networking: A Framework," IEEE Communications Magazine 53, 6, pp. 36-43, Jun. 2015.

Foukas, X. et al., "Demo: FlexRAN: A Software-defined RAN Platform," In Proc. of the SIGCOMM Posters and Demos, Snowbird, UT, USA, 4 pages, 2017.

Gao, L. et al., "Virtual Network Reconfiguration with Load Balancing and Migration Cost Considerations," In Proc. of IEEE INFOCOM. Honolulu, HI, USA, pp. 2303-2311, 2018.

Gudipati, A. et al., "SoftRAN: Software Defined Radio Access Network," In Proc. of ACM HotSDN, Hong Kong, China, pp. 25-30, 2013.

Li, L. E. et al., "CellSDN: Software-defined Cellular Networks," Technical Report, available online at ftp://ftp.cs.princeton.edu/techreports/2012/922.pdf, 6 pages, 2012.

Abolhasan, M. et al., "Software-Defined Wireless Networking: Centralized, Distributed, or Hybrid?," IEEE Network, vol. 29, pp. 32-38, Jul./Aug. 2015.

Demirors, E. et al., "RcUBe: Real-Time Reconfigurable Radio Framework with Self-Optimization Capabilities," in Proc. of IEEE Secon, Seattle, WA, 9 pages, Jun. 2015.

Zhu, M. et al., "SDN-Based Routing for Efficient Message Propagation in VANET," in Wireless Algorithms, Systems, and Applications (K. Xu and H. Zhu, eds.), pp. 788-797, New York City, USA: Springer International Publishing, 2015.

Galluccio, L. et al., "SDN-WISE: Design, prototyping and experimentation of a stateful SDN solution for Wireless SEnsor networks," in Proc. IEEE INFOCOM, Hong Kong, 9 pages, Apr. 2015.

Zimmerling, M. et al., "pTUNES: Runtime Parameter Adaptation for Low-power MAC Protocols," in Proc. ACM/IEEE International Conference on Information Processing in Sensor Networks (IPSN), Beijing, China, pp. 173-184, Apr. 2012.

Luo, T. et al., "Sensor OpenFlow: Enabling Software-Defined Wireless Sensor Networks," IEEE Communications Letters, vol. 16, pp. 1896-1899, Nov. 2012.

Vissicchio, S. et al., "Central Control Over Distributed Routing," in Proc. of ACM SIGCOMM, London, United Kingdom, pp. 43-56, Aug. 2015.

Chiang, M., "Balancing Transport and Physical Layers in Wireless Multihop Networks: Jointly Optimal Congestion Control and Power Control," IEEE JSAC, vol. 23, pp. 104-116, Jan. 2005.

Byrd, R.H. et al., "An Interior Point Algorithm for Large-Scale Nonlinear Programming," SIAM Journal on Optimization, vol. 9, No. 4, pp. 877-900, 1999.

Byrd, R.H., et al., "A Trust Region Method Based on Interior Point Techniques for Nonlinear Programming," Mathematical Programming, vol. 89, No. 1, pp. 149-185, 2000.

Hakiri, A. et al., "Software-Defined Networking: Challenges and research opportunities for Future Internet," Computer Networks 75, pp. 453-471, 2014.

Ding, L et al., "Distributed resource allocation in cognitive and cooperative ad hoc networks through joint routing relay selection and spectrum allocation," Computer Networks 83, pp. 315-333, 2015.

* cited by examiner (a) CellOS vs. OAI (b) CellOS: Throughput and power (c) CellOS: PRBs at time instants $t_1$ and $t_2$

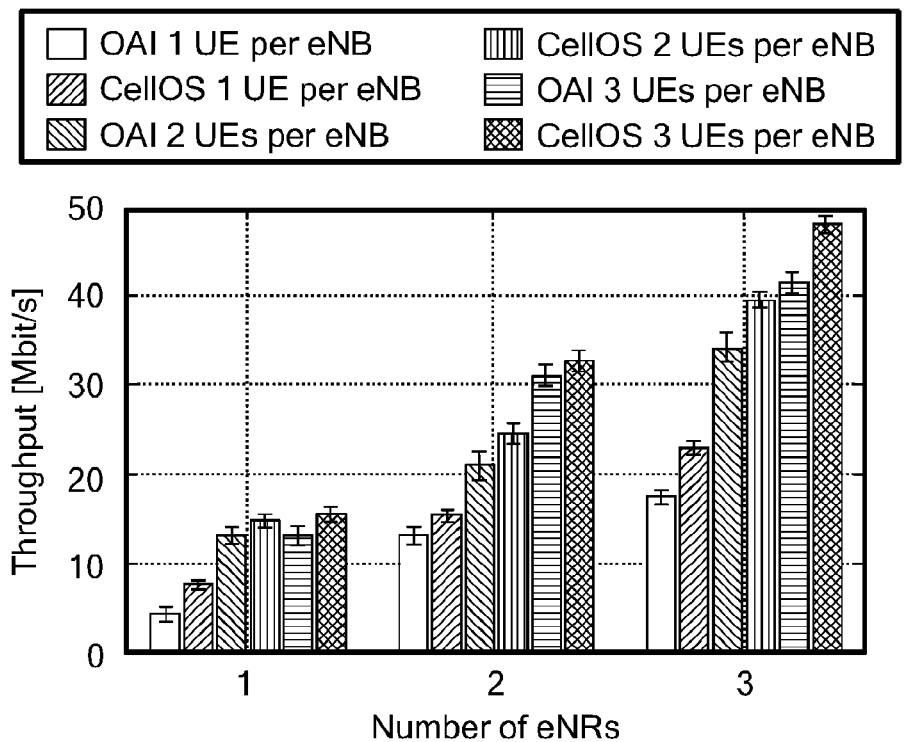
FIG. 8A (a) Throughput
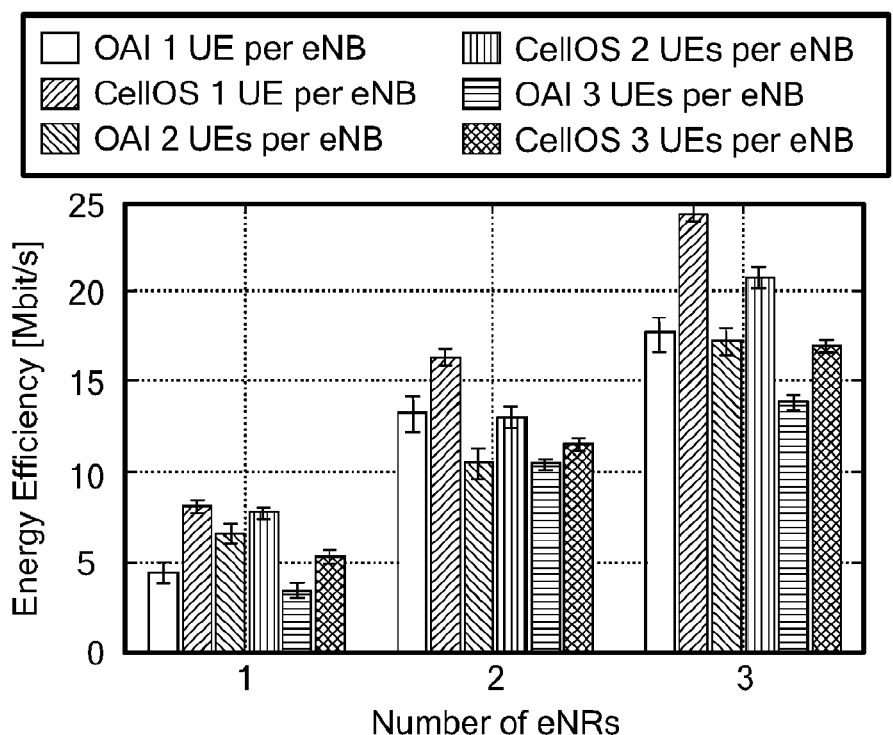
FIG. 8B (b) Energy efficiency

OPERATING SYSTEM FOR SOFTWARE-DEFINED CELLULAR NETWORKS

CROSS REFERENCE TO RELATED APPLICATIONS

This application claims priority under 35 U.S.C. § 119(e) of U.S. Provisional Application No. 62/841,295, filed on 1 May 2019, entitled "Operating System for Software-Defined Cellular Networks," the disclosure of which is hereby incorporated by reference.

STATEMENT REGARDING FEDERALLY SPONSORED RESEARCH OR DEVELOPMENT

This invention was made with government support under Grant Number CNS1618727 awarded by the National Science Foundation. The government has certain rights in the invention.

BACKGROUND

Software-defined networking (SDN) is an approach to network architecture and the operation of networks that centralizes network controllers and separates network control from data forwarding. SDN work has focused primarily on the programmability of wired networks.

SUMMARY

The technology described herein relates to a self-optimizing operating system for wireless software-defined cellular networks. The operating system can provide telecommunications operators (Telco Operators or TOs) with an efficient and flexible network control platform that hides low-level network details through a virtual network abstraction. The operating system can allow the TOs to define centralized and high-level control objectives with no need for in-depth and detailed knowledge of cross-layer optimization theory or the underlying wireless protocol stack implementation. In this operating system, control objectives can be automatically converted into centralized cross-layer mathematical optimization problems that are then transformed into distributed control programs locally executed and solved by each element at the edge of the network, e.g., base stations for LTE or 5G networks.

The operating system can be independent of the underlying network technology and can be adapted to any current or future cellular network. The operating system can be implemented in next-generation cellular networks to significantly simplify the network management and improve performance in general. The operating system can work with software such as the OpenAirInterface (OAI) software implementing features such as per-user downlink power control and various scheduling policies, as well as other interfaces to allow seamless communication between the operating system and OAI. With the operating system, Telco Operators can automatically manage and optimize cellular networks with guaranteed high quality-of-service (QOS) and with reduced monetary and labor force investment in the deployment.

Other features and aspects include the following:
1. A wireless network operating system for communication among a plurality of nodes of a network, the operating system comprising:
    a system host controller, including one or more processors and memory, comprising:
        a network abstraction module operative to create a representation of physical network elements of the network;
        a problem generation module operative to define a network control problem comprising pairing one or more control objectives and one or more constraints with available ones of the physical network elements;
        a problem decomposition module operative to decompose the network control problem into a set of subproblems associated with selected nodes of the network; and
        a solution program dispatcher module operative to dispatch the subproblems as solution programs to the selected nodes for execution using local parameters.
2. The system of 1, wherein the network abstraction module is operative to receive one or more objective functions and one or more constraints of the network control problem based on a descriptive input from a user, and to transmit the one or more objective functions and constraints to the problem generation module.
3. The system of any of 1-2, wherein the network abstraction module is operative to create an abstraction of the network from one or more configuration parameters of the physical network elements of the network, the configuration parameters comprising one or more of an identification of base stations, operational frequency, power budget, minimum rate guarantee, a number of base stations and a number of user equipments (UEs).
4. The system of any of 1-3, wherein the host controller further comprises an application programming interface module operative to receive a user input of an objective function and a constraint and/or one or more network configuration parameters.
5. The system of any of 1-4, wherein the problem generation module is operative to receive an input comprising a descriptive directive of a control objective and a constraint, and to convert the control objective into a utility maximization or minimization function subject to the constraint.
6. The system of any of 1-5, wherein the descriptive directive comprises one or more of maximizing throughput, minimizing power, minimizing energy, guaranteeing a minimum data transmission rate, and a physical resource block allocation policy.
7. The system of any of 1-6, wherein the problem generation module is operative to map the physical network elements into virtual network elements, wherein the physical network elements include one or more of a plurality of base stations and a plurality of user equipments (UEs).
8. The system of any of 1-7, where the problem decomposition module is operative to: identify optimization variables of the network control problem;
    assign each variable to a specific base station of the network or to a specific protocol stack layer of the specific base station;
    identify coupled variables;
    remove coupling across the optimization variables; and
    generate objective functions and constraints with separable terms for association with the specific base stations.
9. The system of any of 1-8, wherein the problem decomposition module is further operative to convert the objective functions into programs for transmission to and executable at the specific base stations using local parameters.

10. The system of any of 1-9, wherein the problem decomposition module is further operative to partition the network control problem horizontally and/or vertically, wherein horizontal decomposition comprises decoupling variables belonging to different physical network elements, and vertical decomposition comprises decoupling variables from different layers of a protocol stack at each of the different physical network elements.

11. The system of any of 1-10, wherein the problem decomposition module is further operative to organize the identified coupled variables into a coupling graph in which coupled variables are joined by an edge.

12. The system of any of 1-11, wherein the problem decomposition module is further operative to decompose the network control problem by a duality technique or a partial linearization technique.

13. The system of any of 1-12, wherein the problem decomposition module is further operative to decompose the network control problem by introducing auxiliary variables, the auxiliary variables provided by one or more of a Lagrangian multiplier, penalization term, and aggregate interference function.

14. The system of any of 1-13, wherein the problem decomposition module is operative to provide the solution programs with mathematical expressions containing symbols in place of local parameters for distribution to the nodes.

15. The system of any of 1-14, wherein the problem decomposition module is operative to convert the subproblems into programs executable at each of the base stations.

16. The system of any of 1-15, further comprising, at each of the selected nodes, a local controller comprising one or more processors and memory, each local controller operative to receive an associated solution program and execute the associated program to set and adjust local parameters specific to the selected nodes in real time, the local parameters including one or more of transmission power, user resource allocation policy, user-base station associations, channel coefficients, channel conditions, level of interference, position of users, size of transmission queues.

17. The system of any of 1-16, wherein the problem decomposition module is operative to convert a control objective into a utility function using symbolic placeholders representative of local parameters specific to the selected nodes.

18. The system of any of 1-17, wherein the local controller is operative, at run-time, to replace the symbolic placeholders with a current local value.

19. The system of any of 1-18, wherein the operating system is an app located in an applications layer of the network.

20. The system of any of 1-19, wherein the network is a LTE network, a 5G network, an open radio access network, or an open network automation platform.

21. A process of communication among a plurality of nodes of a network, comprising: providing the wireless network operating system of any of 1-20;
receiving at the system host controller a descriptive input comprising one or more control objectives and one or more constraints;
generating a set of subproblems associated with selected nodes of the network;
transmitting each of the subproblems as executable solution programs to associated selected nodes; and
executing, at the selected nodes, the solution program using local parameters.

DESCRIPTION OF THE FIGURES

FIGS. 8A, 8B, and 8C are graphs of the sum-log-rate maximization (max (sum (log (rate)))), where (a) is throughput vs. number of eNBs, (b) is energy efficiency vs. number of eNBs, and (c) is Jain's fairness vs. number of eNBs.

DETAILED DESCRIPTION

Figure 1A:
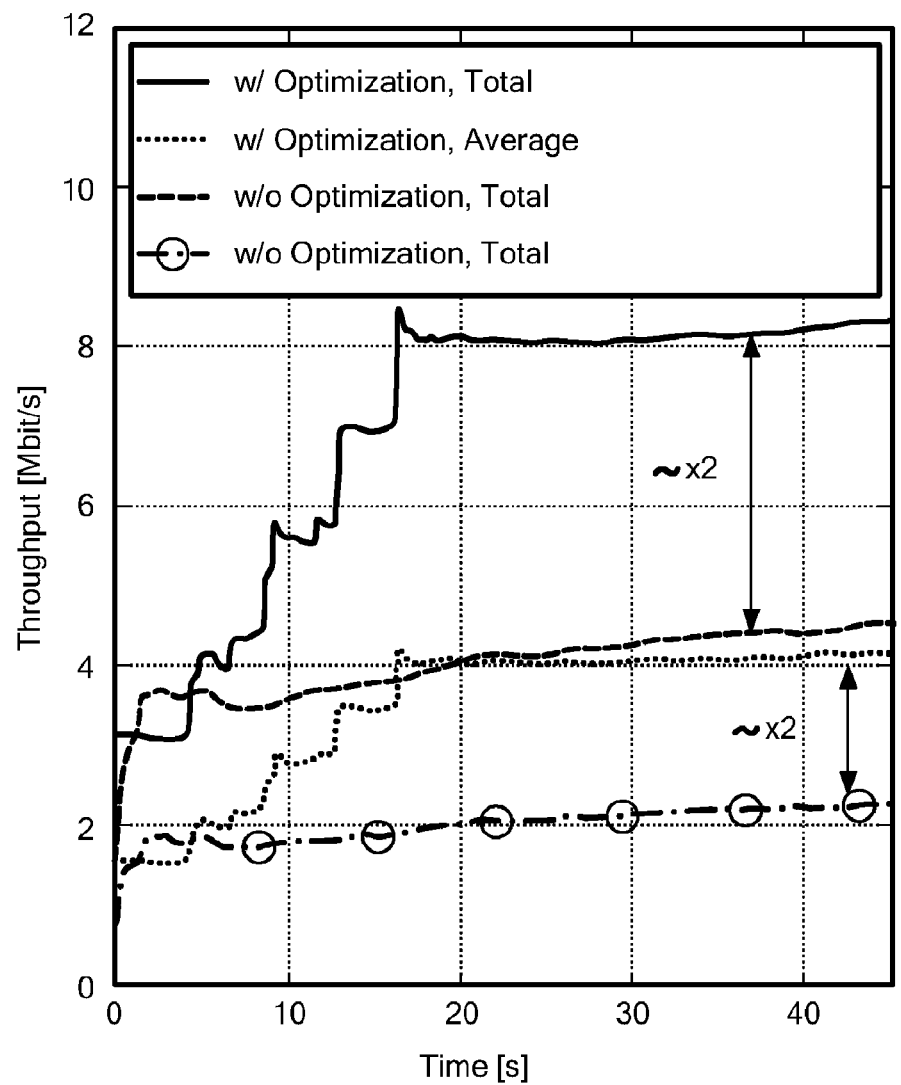
FIG. 1A is a graph of network throughput with and without optimization.

Recent years have heralded Software-Defined Networking (SDN) as the technology that would inherently endow the monolithic Internet architecture with much needed flexibility. However, SDN work has been focused primarily on the programmability of wired networks, The present network operating system can address this deficiency by providing a solution aimed at integrating a flexible and dynamic optimization framework to the operating system and management tools of wireless cellular networks.

A network operating system as described herein can allow telecommunications operators (Telco Operators or TOs) to set network optimization objectives through few lines of code and without requiring expertise in optimization theory or knowledge of network implementation details. Through a variety of APIs, the Telco Operator (TO) sets the network control objective through high level, highly descriptive directives, providing only a few key parameters. The operating system abstracts the underlying network structure, hiding lower-level details to the TO and mapping network elements such as base stations and User Equipments (UEs) into virtual ones. By using an abstraction hiding low-level network details, the operating system can automatically generate distributed solution programs to be run at individual base stations to collectively and collaboratively optimize a given network objective.

More particularly, once the TO specifies the desired control objective, the operating system can convert it into a set of mathematical expressions that are used to define a centralized optimization problem. The generated centralized optimization problem is then decomposed into a set of distributed sub-problems, one for each of the edge elements (e.g., base stations). Based on rigorous mathematical techniques, the centralized problem is partitioned both horizontally (decoupling variables belonging to different elements) and vertically (decoupling variables from different layers of the protocol stack of each element). The obtained sub-problems are then converted into executable programs that are individually dispatched to each network element. After receiving the distributed solution program, each element, e.g., each base station, can iteratively run it through its local solver to reach the set network objective.

In one implementation a softwarized radio access network (RAN) environment is made up of base stations that implement an LTE-compliant OAI software extended to set and adjust parameters such as transmission power and user resource allocation policies in real time. The operating system Optimization Framework can be independent of any specific RAN and can be seamlessly interfaced with any other current or future softwarized cellular stack.

The network operating system (also termed "CellOS" herein) can provide automatic self-optimization of softwarized cellular networks aimed at bridging the gap between software-defined networking (SDN) and cross-layer distributed optimization techniques. Unlike known SDN-inspired solutions for cellular networking, the operating system can (i) hide low-level network details through a virtual network abstraction; (ii) allow the Telco Operator to define high-level control objectives without requiring knowledge of optimization techniques or of the underlying network, and (iii) generate distributed control programs to be executed at each base station unit to optimize the network performance. The operating system can allow swift implementation of different network control strategies by modifying only a few lines of code on a centralized abstraction. The operating system can improve performance metrics, including throughput, energy efficiency, and user fairness.

Current commercial cellular networks mostly rely on inflexible hardware-based architectures. While this approach is good enough to provide mobile users with high performance services in many cases, resources such as spectrum, computing and transmission power are often either partially or inefficiently utilized due to the inflexibility of the infrastructure. By running cross-layer optimization algorithms to jointly optimize per-user transmission power and scheduling, it is possible to achieve gains, such as improving the throughput of the network.

For this reason, over the years the research community has developed a variety of optimized protocols and algorithms to better utilize network resources and improve network performance. Due to the lack of hard real-time constraints, offline solutions to optimize frequency and network planning have already been adopted in many commercial network applications. However, because of their strict timing requirements, the same does not hold for lower-layer problems, such as scheduling and power control. Policies concerning these, in fact, rely on static or heuristic solutions. In contrast, the operating system described herein can provide a fast and flexible programmatic control framework that can jointly (i) meet real-time requirements of lower layers of the protocol stack; and (ii) autonomously and quickly adapt optimization variables to the time-varying network dynamics (e.g., channel conditions, position of users, size of transmission queues, etc.).

In this context, software-defined networking (SDN) has been proposed as a promising technology to overcome the above limitations by abstracting the physical network and decoupling the data and control planes. However, to date the majority of the current practice and ongoing research on SDN focuses on the wired portion of the infrastructure; and only recently it has been extended to wireless networks. This comes as no surprise as wireless networks have an unsteady behavior in terms of topology and traffic patterns. These time-varying fluctuations generate a large amount of signaling and control traffic that the low-capacity and interference-sensitive fronthaul cannot support, thus making it hard to implement a centralized control approach as in software-defined wired networks.

To address these challenges, research has been focusing on pushing the SDN control plane as close to the edge of wireless networks as possible. For instance, network-level decisions are made by a centralized controller, and latency-sensitive local decisions are executed inside the base stations.

However, these approaches either neglect optimization or only provide nonscalable centralized solutions. The situation will get even worse with the advent of 5G, where Telco Operators (TOs) adopt tiered network architectures with densely-deployed base stations. These create small cells, possibly partially overlapped with each other, and provide service to users in their short proximity. As a consequence, centralized optimization approaches and inflexible hardware implementations are not capable of controlling large-scale and densely-deployed networks with disparate topologies, femtocells, device-to-device links and heterogenous hardware. Despite these recent efforts in applying SDN principles to cellular systems, to date there is no consensus on the principles underlying SDN-based architectures for large-scale next-generation cellular networks.

Challenges Addressed. Designing and implementing such a complex system surely does not come without challenges. In fact, suitable architectures for SDN cellular systems as described herein can (i) strike the correct balance between case of centralized control and the need to operate in a highly decentralized and rapidly changing edge infrastructure; (ii) provide TOs with elastic and effective tools to enable real-time prototyping, implementation and assessment of new protocols and algorithms; (iii) devise a network-agnostic distributed optimization framework able to abstract the general network infrastructure and parameters that will be known at run-time only (e.g., user-base station associations, user channel information, resource requirements, and so on); (iv) automatically convert high-level control directives into distributed control programs to be executed at each base station; and (v) meet the strict timing requirements imposed by cellular networks.

To address these challenges, the self-optimizing operating system for next-generation cellular networks described herein can operation within the SDN paradigm to extend the decoupling among control and data planes by including an additional decoupling layer among control and optimization planes. As illustrated in FIG. 1b, the operating system can provide TOs with an efficient and flexible network control platform that (i) hides low-level network details through a virtual network abstraction; and (ii) allows them to define centralized and high-level control objectives (e.g., "maximize network throughput," "minimize power consumption with minimum rate guarantees") with no need for in-depth and detailed knowledge of cross-layer optimization theory or the underlying wireless protocol stack implementation. In the operating system, control objectives can be automatically converted into centralized cross-layer mathematical optimization problems that are then transformed into distributed control programs locally executed and solved by each element at the edge of the network, e.g., LTE or 5G base stations.

Figure 1B:
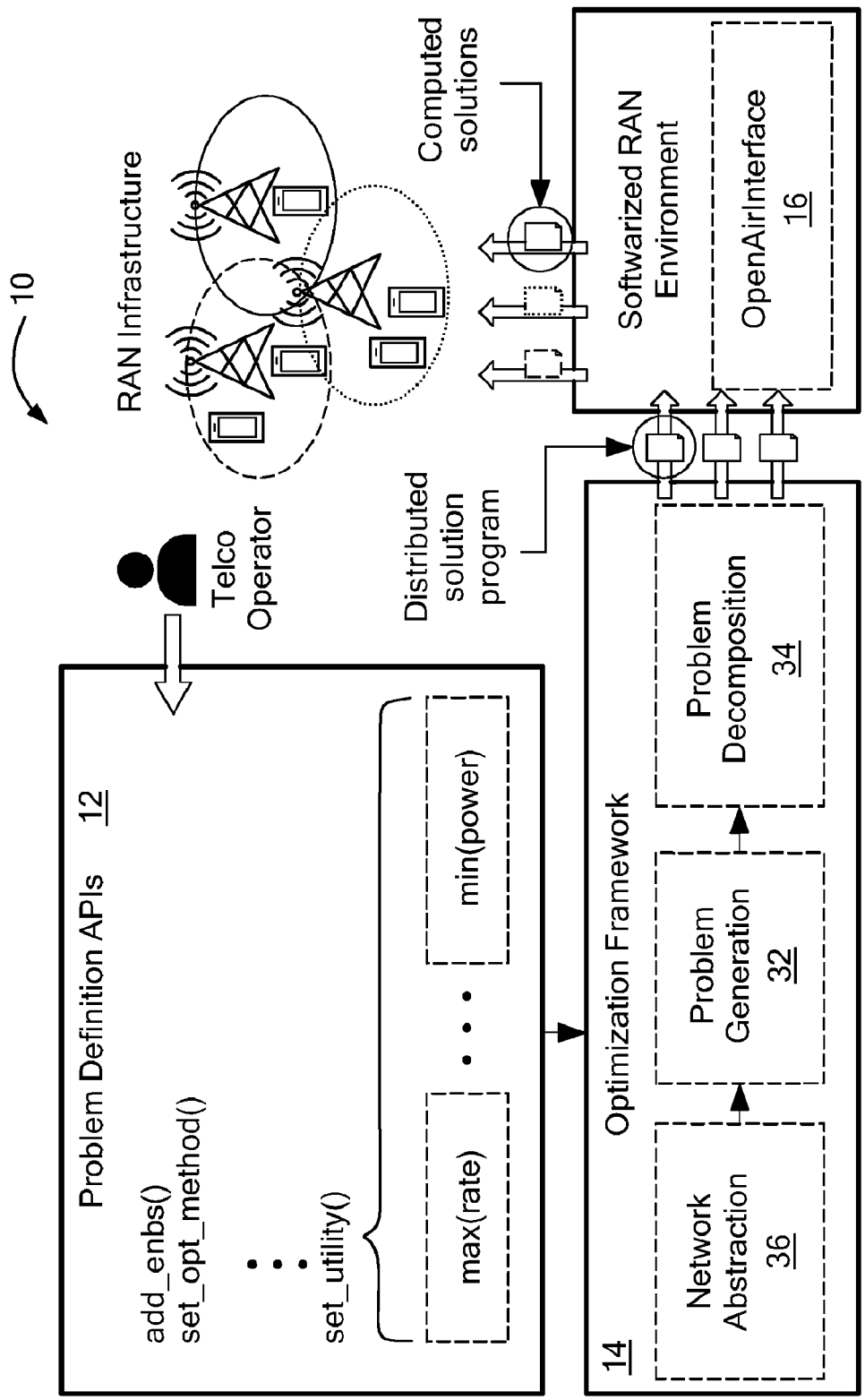
FIG. 1B is a schematic illustration of an operating system architecture of the technology described herein.

For example, FIG. 1A illustrates an example using the open-source software OpenAirInterface (providing a standard compliant implementation of Release 10 LTE) to deploy an LTE network with two interfering base stations and two mobile users. In one case, LTE downlink proportional-fairness scheduling and standard power control policies were employed; in the other case, instead, optimal scheduling and power control strategies were employed. By using exactly the same underlying cellular infrastructure, FIG. 1A shows that by running cross-layer optimization algorithms to jointly optimize per-user transmission power and scheduling it is possible to achieve immediate gains, in this case, by doubling the throughput of the network.

The operating system can be provided as an app in an applications layer of a network architecture. The operating system can be seamlessly integrated within large orchestration environments such as Open Network Automation Platform (ONAP) and Open Radio Access Network (O-RAN). The operating system can also be used as a standalone operating system.

The operating system can automatically self-adapt to the current network deployment and its changes, self-optimizing the network performance in a variety of network configurations and scenarios (e.g., low and high interference). The operating system can achieve improved or increased network throughput gains, in some cases up to 75%, as well as better energy-efficiency, and fairness among mobile users, compared to existing network systems.

In this way, the operating system can effectively bridge the gap between centralized/distributed optimization techniques and Software-Defined Networking by generating distributed control programs not based on design-by-intuition principles but on rigorous mathematical models from non-linear optimization theory.

1. Operating System Overview

A schematic illustration of the operating system architecture 10 is shown in FIG. 1B. Its main components are an interface to the TO providing the Problem Definition APIs 12, an automatic Optimization Framework 14, and a Softwarized Radio Access Network (RAN) Environment 16, at the network mobile edge.

Through a variety of APIs, the TO sets the network control objective through high level, highly descriptive directives (e.g., "maximize throughput," or "minimize power with minimum rate guarantees"), providing a few key parameters (e.g., the number of base stations). That is all the TO needs to specify, as the operating system abstracts the underlying network structure, hiding lower-level details to the TO and mapping network elements such as base stations and User Equipments (UEs) into virtual ones (at Network Abstraction block or module of the Optimization Framework). Once the TO specifies the desired control objective, the operating system converts it into a set of mathematical expressions that are used to define a centralized optimization problem, namely, the analytical representation of the optimization objective and of its constraints (Problem Generation block or module in FIG. 1b). The generated centralized optimization problem is then automatically decomposed into a set of distributed sub-problems, one for each of the edge elements (e.g., base stations). This is done by a decomposition engine, a component of the Problem Decomposition module. Based on rigorous mathematical techniques, the centralized problem is partitioned both horizontally (decoupling variables belonging to different elements) and vertically (decoupling variables from different layers of each element protocol stack). The obtained sub-problems are then automatically converted into executable programs that are individually dispatched to each element (distributed solution programs, in the softwarized RAN environment). After receiving the distributed solution program, each base station iteratively runs it through its local solver. For example, in one implementation the softwarized RAN environment is made up of base stations that implement an LTE-compliant OAI software extended to set and adjust parameters such as transmission power and user resource allocation policies in real time. In fact, the operating system Optimization Framework can be independent of any specific RAN and can be seamlessly interfaced with other networks, including any other current or future 5G softwarized cellular stack.

2. Operating System Architecture

Figure 2:
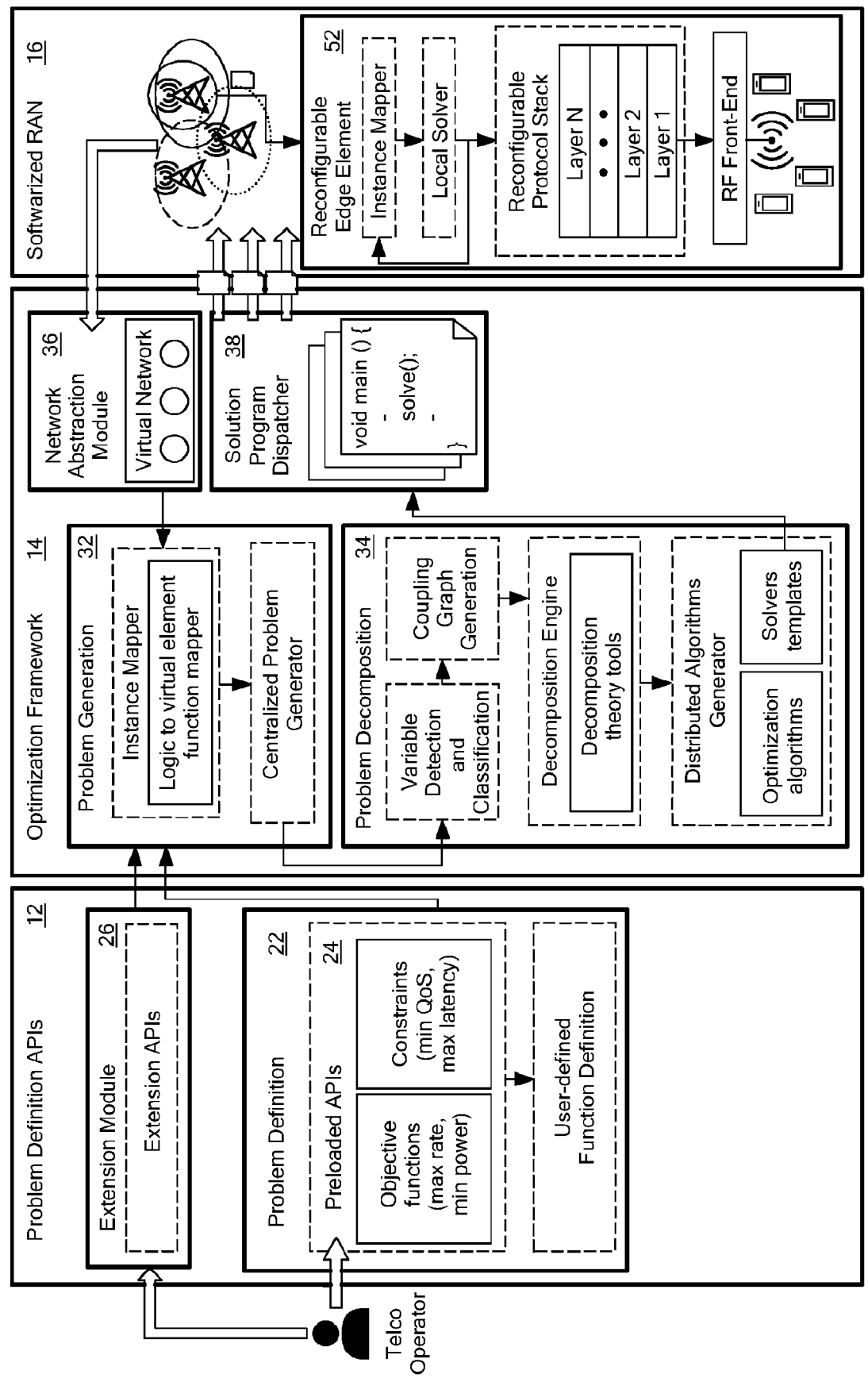
FIG. 2 is a further schematic illustration of the operating system architecture of FIG. 1B.

The detailed structure of the operating system architecture is depicted in FIG. 2. This section describes in greater detail the components, starting from the interface 12 to the user (the TO), proceeding with the Optimization Framework 14 and finally the Softwarized RAN 16.

2.1 Problem Definition APIs

At the interface, the operating system can include a problem definition module 22 by which a TO can specify one or more objective functions and one or more constraints. Thus, the operation system defines a set of APIs for the TO to specify general high-level information about the desired network configuration. These APIs include those to add base stations, to set operational frequencies, power budgets and custom per-user requirements (e.g., minimum rate guarantees). The network control objective can be specified by typing a simple textual string. For instance, with max (rate) the TO can indicate that it wants to maximize the network rate; min (power) can be used instead to minimize the overall power consumption.

An example of (actually executable) operating system APIs and of the few lines of code needed to program a network objective are shown in Listing 1.

Listing 1 Operating System API Example

```
1.   from class_definition import Network, Engine
# Network instantiation
2.   nwk = Network( )
3.   nwk.add_enbs(enbs_no, allowed_channels, antenna_no,
     power_budget)
# Set optimization problem and optional contstraints
4.   nwk.set_utility('min(power)')
5.   nwk.add_constraints({'user_min_rate':[usr_id, rate]})
# Initialize optimization engine
6.   eng = Engine( )
7.   eng.set_opt_method('sub-gradient')
8.   nwk.initialize_engine(eng)
```

In this example, the TO instantiates a new network (line 2) and adds a number enbs_no of LTE base stations (i.e., eNBs), with relevant parameters (line 3). An optimization problem aiming at minimizing the network power is then simply set in line 4, with constraints for guaranteeing a minimum rate defined in line 5. Note that very few lines of code are needed for the TO to set the network goal, after which no further interaction is needed. This is because the operating system hides all low-level network details (e.g., channel condition, position of mobile users, and data traffic) from the TO, and also automatically defines and distributively solves the optimization problem corresponding to the set control objective.

While specifying the objective function in textual form is enough for CellOS to properly work, an experienced TO may want to specify custom and more advanced objective functions. To this aim, in addition to the preloaded APIs 24, the operating system includes an extension module 26 providing additional APIs for custom mathematical expressions and optimization constraints, also allowing the TO to select specific optimization techniques and solvers. These can then be fed to the Optimization Framework in the same way preloaded APIs are.

2.2 Optimization Framework

The Optimization Framework 14 of the operating system is in charge of converting preloaded and extension APIs into an optimization problem (e.g., at a problem generation component or module 32), decomposing the problem into sub-problems (e.g., at a problem decomposition component or module 34), creating and maintaining an abstraction of the network (e.g., at a network abstraction component or module 36), and dispatching solution problems to the softwarized RAN (e.g., at a solution program dispatcher component or module 38).

2.2.1 Problem generation. In order to transform high-level specifications into an optimization problem, the operating system first pairs high-level abstraction directives (control objective and constraints) with available network elements (e.g., base stations and users). This is accomplished by the instance mapper module that maps physical network elements to their virtual representations, and converts the control objective defined using high-level operating system APIs (Section 3.1). For example, max(sum(log(rate))) is converted into $\max \Sigma_{u \in \mathcal{U}} \mu \log(r_u)$ where $\mu$ is the set of mobile users and $r_u$ represents their transmission rate. As mentioned above, custom optimization solvers can be programmed by using APIs from the extension module. The generated utility is kept as general as possible by using symbolic placeholders in lieu of parameters whose value will only be known at run-time (e.g., UE-base station associations, users' channel coefficients, interfering signals, etc.). In so doing, the Optimization Framework is UE-agnostic. It is the base stations that, at run-time, replace the symbolic placeholders with their current value.

$$\underset{x \in X}{\text{maximum}} f(x) \quad \text{(CEN)}$$

$$\text{subject to } g_i(x) \le h_i(x), \forall i \in \mathcal{I} \quad (1)$$

2.2.2 Problem decomposition. The problem decomposition component or module of the Optimization Framework partitions the centralized problem into multiple sub-problems, one for each network element, to be eventually solved distributively at each base station. This section describes how problem decomposition is performed by the operating system. In general, the centralized network control problem can be formalized as the following network utility maximization problem where x represents the optimization variables (e.g., scheduling policies or transmission power levels), X is the strategy space (i.e., the set of all feasible strategy combinations), f(·) is the network-wide objective function (e.g., the overall capacity or the total energy efficiency of the network). Inequality (1) represents the set I of constraints (e.g., the transmission power must be bounded by some constant value; each Physical Resource Block (PRB) can be allocated to one UE only, etc.). The biggest challenge in solving the centralized network control problem in (CEN) is that both objective function and constraints are, in general, coupled to different edge network elements and to different layers of each element protocol stack. Because of this tight coupling, generating distributed sub-problems that can be locally solved by each network base station becomes challenging. To address this challenge, the operating system first identifies coupled variables and applies rigorous decomposition and distributed optimization techniques to generate new sub-instances of the centralized network control problem (CEN) that are automatically assembled into sub-programs to be executed at each base station. This is accomplished performing the following (FIG. 2): variable detection and classification, coupling graph generation, decomposition (through the decomposition engine), and distributed algorithms generation.

Variable detection and classification. The operating system starts by identifying the optimization variables of the network control problem. For instance, in (CEN) the operating system detects x to be the set of optimization variables of the problem. Then, it determines which layer of the protocol stack houses which variable. For instance, power belongs to the PHY layer, scheduling to the MAC layer, and so on. The operating system then identifies to which base station each variable belongs. As a result, each variable is assigned to a specific base station and to one of its protocol stack layers.

Figure 3A:
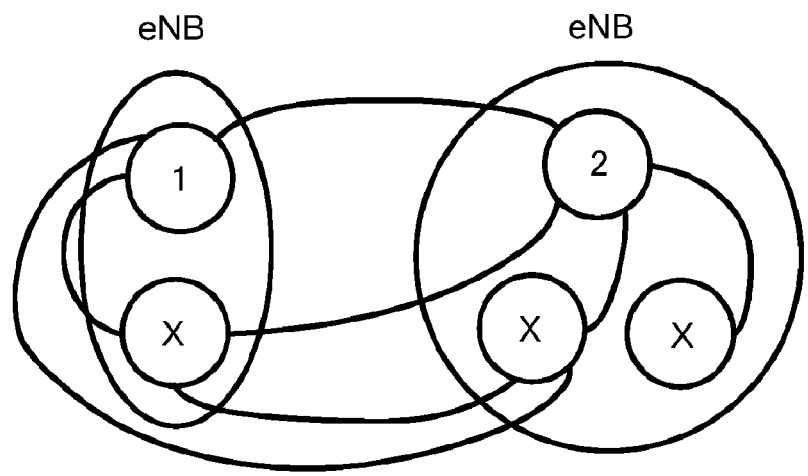
FIG. 3A is a coupling graph between eNB variables.

Coupling Graph Generation. After detecting and classifying problem variables, the operating system organizes their coupling in a graph $G=(V, E)$, where V is the set of variables of the network control problem, which are joined by an edge in E only if they are coupled. An example of a coupling graph is shown in FIG. 3A.

Figure 3B:
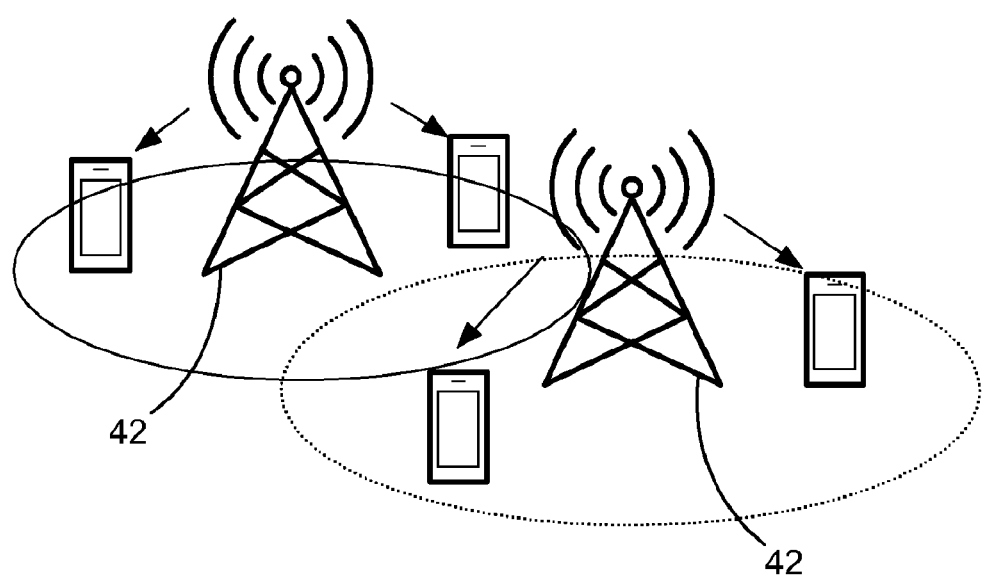
FIG. 3B is a schematic illustration of an example network scenario.

The coupling graph, which for illustrative purposes only includes a subset of the optimization variables of the control problem (CEN), concerns the scenario with two base stations 42 (e.g., LTE eNBs) depicted in FIG. 3B. The five variables, which in real-life network deployments are used, for example, to represent PHY and MAC layer strategies such as transmission power and PRB allocation, are coupled as indicated by the edges. FIG. 3A shows that coupling is not restricted to variables of a single eNB, but it can also involve those controlled by other eNBs of the network.

Decomposition Engine. Variable detection/classification and coupling graphs are preliminary to automated problem decomposition, which can be performed by using known techniques, including well-established techniques such as duality theory and decomposition via partial linearization (DPL). Decomposability is achieved by introducing auxiliary variables (e.g., Lagrangian multipliers, penalization terms, and aggregate interference functions) that remove coupling across optimization variables and generate objective functions and constraints with separable terms. Note that the operating system can automatically generate distributed control programs to optimize network performance based on a high-level objective, irrespective of the decomposition method used.

Coupling in cellular networks involves heterogeneous network elements and different layers of the protocol stack. For this reason, coupling can generally be classified into horizontal coupling and vertical coupling. Horizontal coupling reflects dependencies among different network elements (e.g., among interfering base stations and their subscribers). Vertical coupling, instead, concerns cross-layer dependencies among different layers of the protocol stack of the same element (e.g., MAC policies affect transmission power and modulation strategies at the PHY layer). Coupling makes centralized control of cellular networks challenging: (i) the number of variables of the problem grows exponentially with the number of network elements, resulting in high computational and time complexity; (ii) the TO needs to be fully aware of the underlying network topology, the traffic demand, and the Channel State Information (CSI) for each individual UE and base station, and (iii) centralized approaches require real-time information exchange between each network element and the centralized controller, imposing high signaling overhead. The present operating system overcomes these challenges with distributed solutions. Even though distributed algorithms might not always guarantee globally optimal solutions, they usually manage to compute locally optimal ones with significantly lower computational complexity than that of centralized approaches. An explanatory example of a decomposition problem is provided below (Section 2.2.4).

Distributed Algorithms Generator. The next step to achieve distributed control of the cellular network is to generate distributed solution programs. These programs are to be executed at each base station and can be solved, for example, through standard and commercially available optimization solvers. This final task is performed by the distributed algorithms generator component of the operating system Optimization Framework (FIG. 2). As mentioned, the Optimization Framework is not cognizant of the value of those parameters that are necessarily available only at run-time. For this reason, the distributed solution programs are formed of mathematical expressions containing symbols in place of run-time parameters. Each base station can later replace these symbols at run-time with their actual value, and associate optimization variables to each served UE. The instance mapper module can perform this task (FIG. 2). This feature of the operating system makes the solution program generation process (i) fully automated, (ii) independent of network details, and (iii) self-adapting to compute variables and parameters at run-time based on current prevailing network conditions.

2.2.3 Dispatcher and Abstraction Module. Two additional components of the Optimization Framework are the solution program dispatcher and the network abstraction module. The first component is used to transfer the distributed solution programs generated by the problem decomposition component to each network base station, which can solve and execute them to achieve the desired network objective. The dispatcher can be implemented in many different ways (e.g., via sockets, shared files, etc.). Irrespective of how it is implemented, it manifests the flexibility of the SDN paradigm in providing dynamic connection between the data plane of the Softwarized RAN and the self-optimizing control framework.

The network abstraction module creates a high-level representation of the physical network structure, hiding low-level hardware and software details from the TO. This representation allows the problem generation module (Section 2.2) to automatically convert the network directives and constraints given by the TO into mathematical expressions and utility functions to be optimized.

2.2.4 Optimization Framework: An example. Consider the scenario depicted in FIG. 3B, where two interfering LTE eNBs share two channels and serve two UEs each. $U_b$ is the set of users u served by eNB $b \in B$, B is the set of base stations. We consider a downlink cross-layer optimization problem where each eNB has a maximum transmission power budget, $P^{max}$, and that the UEs request minimum capacity $C^{min}$. The optimization variables of this problem concern MAC and PHY layers, namely, user scheduling and transmission power allocation, respectively. In this example stipulate that the TO wants to maximize the overall capacity of the network. By using the operating system, the TO first needs to instantiate a network with two base stations, i.e., nwk=Network( ) and nwk.add_enbs(2, allowed_channels, antenna_no, power_budget). It then simply sets the following network control objective: nwk.set_utility('max (capacity)').

On the other hand, the operating system to perform a more complex set of operations to reach the objective specified so succinctly by the TO. Let $y=(y_1, y_2)$ represent the network scheduling profile, where $y_b=(y_{b.1.n}, y_{b.2.n})$ n=1,2 is the scheduling profile for eNB $b \in \{1, 2\}$. Let $y_{b.u.n}$, instead, represent the scheduling variable such that $y_{b.u.n}=1$ if user u is scheduled for downlink transmission on channel n and $y_{b.u.n}=0$, otherwise. Similarly, $p=(p_1, p_2)$ represents the network power allocation profile, where $p_b=(p_{b.1.n}, p_{b.2.n})$ n=1,2 is the power allocation profile for eNB b, and $p_{b.u.n}$ represents the downlink transmission power from eNB b to user u on channel n. Let $C_{b.u}(y, p)$ be the capacity for UE u served by eNB b on channel n. Expressing capacity $C_{b.u}(y, p)$ through the Shannon equation, the following is obtained:

$$C_{b,u,n}(y, p) = B \cdot \log_2\left(1 + \frac{g_{b,u,n} y_{b,u,n} p_{b,u,n}}{N + g_{b',u,n}\left(\sum_{u' \in U_{b'}} p_{b',u',n} y_{b',u',n}\right)}\right). \quad (2)$$

where B is the employed bandwidth, N is the background noise power, and $g_{b.u.n}$ is the channel gain coefficient.

The centralized network control problem can be expressed as the following Capacity Maximization Problem (CMP)

$$\underset{y,p \in X}{\text{maximum}} \sum_{b \in B} \sum_{u \in U_b} \sum_{n=1}^{2} C_{b,u,n}(y, p), \quad \text{(CMP)}$$

$$\text{subject to } \sum_{n=1}^{2} C_{b,u,n}(y, p) \geq C^{min}, \quad (3)$$

$$\forall b \in B, u \in U_b$$

$$\sum_{u \in U_b} \sum_{n=1}^{2} p_{b,u,n} \leq P^{max}, \forall b \in B \quad (4)$$

$$\sum_{n=1}^{2} y_{b,u,n} \leq 1, \forall b \in B, \forall u \in U_b \quad (5)$$

where (3) represents the users' minimum capacity constraint, (4) enforces eNBs' power budget, and (5) guarantees that each eNB allocates each channel to a single UE only, as in standard LTE implementations.

The main challenges in decomposing (CMP) are: (i) it is a Mixed Integer Non-Linear Programming problem, which is NP-hard in general; (ii) both (2) and (3) are coupled among different eNBs; and (iii) (3) might not be feasible for all UEs, thus making it impossible to find a solution.

The operating system recognizes y and p to be the problem optimization variables. Then, it associates y and p to the MAC and PHY layers, respectively. At this point, the problem decomposition module understands which variables are controlled by which eNB and creates a coupling graph similar to that in FIG. 3a. This will be used to identify coupling among network elements, to generate auxiliary variables and to create decomposed sub-problems to be executed at each eNB. For instance, the coupling graph is used by the operating system to detect the presence of an aggregate interference term in the capacity expression of (2). Accordingly, it defines the following auxiliary function $$h_{b,u,n}(y_{-b}, p_{-b}) = \sum_{b' \in \mathcal{B}\setminus\{b\}} g_{b',u,n} \sum_{u' \in \mathcal{U}_{b'}} p_{b',u',n} y_{b',u',n} \quad (6)$$

where $y_{-b} = y \forall \{y_h\}$ and $p_{-b} = p \forall \{p_h\}$ are the scheduling and power allocation variables of the eNBs belonging to $B \forall \{b\}$. At this point, new auxiliary variables are introduced to rewrite (CEN) as $$\text{maximum}_{y,p,i} \sum_{b \in \mathcal{B}} \sum_{u \in \mathcal{U}_b} \sum_{n=1}^{2} C_{b,u,n}(y_b, p_b, i_b), \quad \text{(DCMP)}$$

$$\text{subject to } \sum_{n=1}^{2} C_{b,u,n}(y_b, p_b, i_b) \geq C^{min}, \quad (7)$$

$$\forall b \in \mathcal{B}, u \in \mathcal{U}_b$$

$$i_{b,u,n} \geq h_{b,u,n}(y_{-b}, p_{-b}), \forall b \in \mathcal{B}, u, n = 1, 2 \quad (8)$$

Constraints (4), (5)

The operating system can now use duality optimization tools to generate the following Lagrangian dual function $$L(\lambda, p, i, y, p) = \sum_{b \in \mathcal{B}} \sum_{u \in \mathcal{U}_b} \sum_{n=1}^{2} C_{b,u,n}(y_b, p_b, i_b) - \quad (9)$$

$$\sum_{b \in \mathcal{B}} \sum_{u \in \mathcal{U}_b} \lambda_{b,u} \left( C^{min} - \sum_{n=1}^{2} C_{b,u,n}(y_b, p_b, i_b) \right) -$$

$$\sum_{b \in \mathcal{B}} \sum_{u \in \mathcal{U}_b} \sum_{n=1}^{2} \mu_{b,u,n}(h_{b,u,n}(y_{-b}, p_{-b}) - i_{b,u,n}).$$

where $\lambda = (\lambda_{b,u,n})$ and $\mu = (u_{b,u,n})$ are the non-negative Lagrangian multipliers used in traditional constrained optimization.

Observe that problems (CMP) and (DCMP), and the Lagrangian dual function (9) all aim at solving the centralized control problem (CEN). However, the advantage of using (9) is that function L ($\lambda$, $\mu$, i, y, p) is written with separable variables, meaning that it can be split into |B| sub-problems locally solvable by each eNB, where |·| is the set cardinality.

The operating system finally sends the generated distributed solution programs to the eNBs that in turn populate them with information on the UEs they are serving (e.g., their channel coefficients). Optimized solutions are computed by each eNB local solver component, and Lagrangian coefficients are updated and exchanged among the different eNBs until convergence to a (locally) optimal solution.

2.3 Softwarized RAN

The third component 16 of the operating system architecture (FIG. 2) is in charge of running the distributed solution programs at each network element so to reach the global network objective requested by the TO. Once the dispatcher has delivered the programs, the instance mapper component or component of a Reconfigurable Edge Element (REE) component or module 52 replaces the symbolic placeholders in the program with their corresponding run-time values. This instance mapper component is capable of dynamically adapting solution programs to current network conditions, such as arrival/departure of UEs as well as handovers and channel state information (CSI). At the end of this mapping procedure each program is executed by the local solver and a solution is computed. As mentioned above, the operating system uses decoupling terms (e.g., Lagrangian multipliers) to allow individual base stations to coordinate with each other. Relevant parameters can be iteratively updated and exchanged among the coupled REEs through already available inter-base station interfaces (e.g., X2 interfaces of LTE networks). Upon computing optimal solutions for each local network control problem (e.g., which users should be scheduled), these solutions are used by each REE through a Reconfigurable Protocol Stack (RPS) that controls MAC and PHY layers, among others.

RPSs allow swift, on-the-run reconfiguration of REEs. The following are two reconfiguration examples.

Reconfiguration example 1: Power Control. Operating system-managed base stations are able to control the power level for downlink and uplink data transmissions on a per-user basis. A practical usage of this feature is that of a base station tuning the power level towards UEs at the cell edge to reduce interference to nearby base stations subscribers.

Downlink transmission in multi-carrier cellular systems (e.g., LTE) implements per-user power control by leveraging low-level signal processing techniques where signals to UEs are pre-processed for power level fine-tuning. Particularly, the operating system amplitude-modulates the complex data signals that eNBs send to their UEs to control downlink power. Let $s_{b,u}(t)$ be the downlink data signal that base station $b \in B$ has to deliver to UE $u \in U_b$ at time t, where B and $U_b$ are the set of network base stations and of the users that b is serving, respectively. The transmitted signal power is adjusted by multiplying the original signal $s_{b,u}(t)$ with a positive constant as follows:

$$s'_{b,u}(t) = \sqrt{a_{b,u}} s_{b,u}(t), b \in B, u \in U_b$$

where $a_{b,u}$ is the multiplier that b employs at time t to amplitude-modulate the complex data signal to u. Such an approach makes it possible to fine-tune the transmitted signal power reducing it by a factor equal to $a_{b,u}$. Reconfiguration is easily made possible by the REE computing new solutions for $a_{b,u}$ by executing the distributed solution program received by the Optimization Framework.

Uplink power control optimization is dealt with similarly. The operating system enables the TO to select between open-loop and closed-loop power control, which affects how the uplink transmission power of each UE is determined. Irrespective of the selected method, uplink power is reconfigured by having the REE run the distributed solution program with current local parameter values, determining the per-user uplink power and communicating it to the UE (closed-loop), or adjusting its Reference Signal (RS) to which each UE adapts (open-loop).

Reconfiguration Example 2: Scheduling and PRB Allocation. The base station's RPS includes a MAC-layer virtual control plane that allows the REEs to dynamically adapt subscribers' PRBs allocation to efficiently distribute resources and balance traffic across multiple subcarriers. The main challenge in the design of this control plane is to determine the optimal PRB allocation while meeting the strict time constraints of cellular networks. For example, in LTE downlink transmissions PRBs are the smallest resource unit eNBs can allocate to UEs. Because of the PRB short time duration, it is important to compute PRB allocation very quickly to guarantee compliance with LTE and serve the UEs. The operating system addresses the above strict timing requirements by leveraging the distributed optimization feature of the Optimization Framework, which reduces the computational and time complexity of the scheduling problem. Repeated local execution of the distributed solution program allows each REE to recompute optimized allocation of PRBs to the users, allowing for swift reconfiguration that maintains local optimality.

Figure 11:
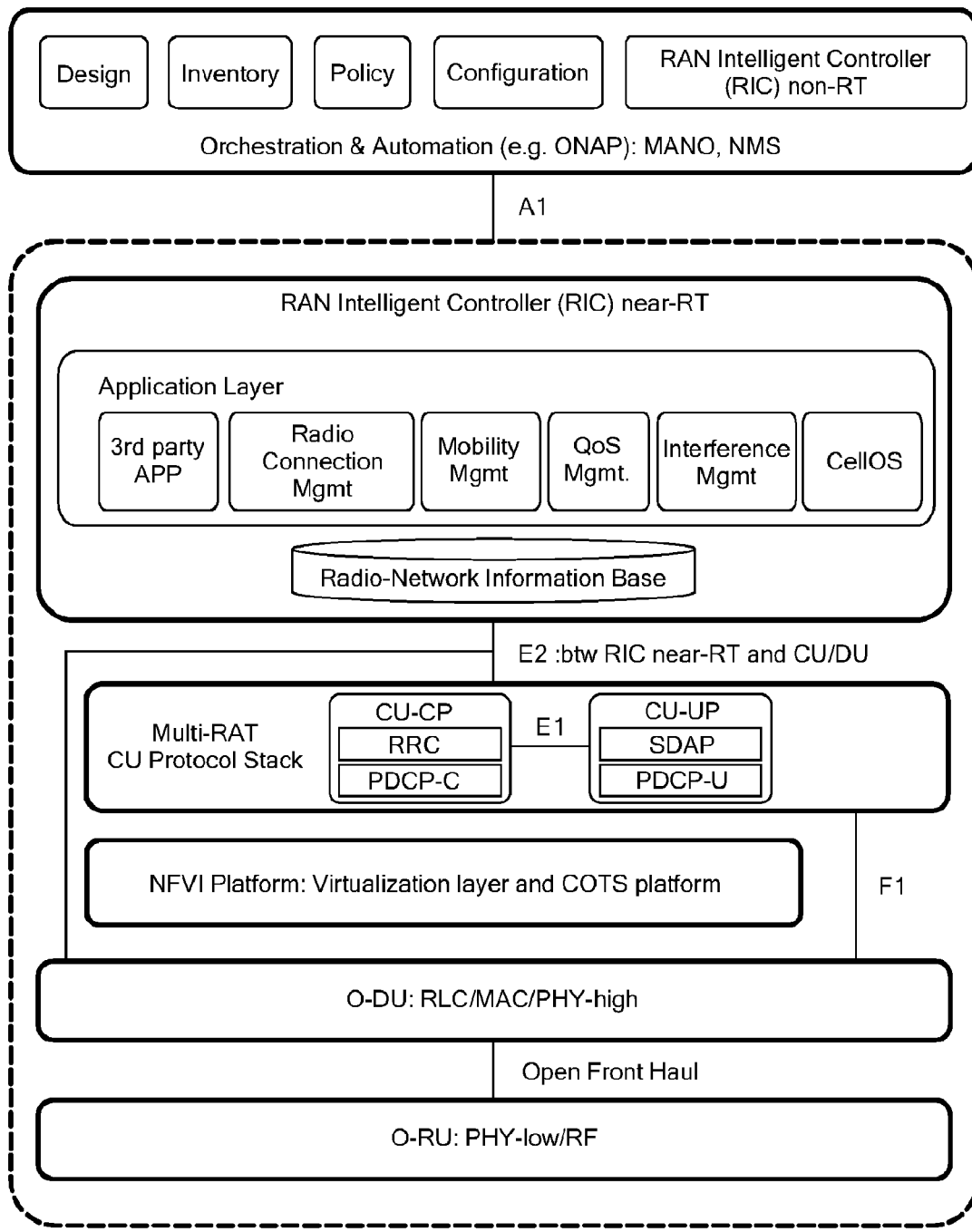
FIG. 11 is a schematic illustration of an operating system as described herein provided as a RAN intelligent controller (RIC) app in an O-RAN architecture.

The operating system can be provided as an app in an applications layer of a network architecture. For example, FIG. 11 illustrates the operating system (CellOS) in an applications layer of a RAN Intelligent Controller (RIC) of an Open Radio Access Network (O-RAN).

In summary, the technology described herein can provide a network operating system for self-optimizing softwarized cellular networks. The operating system allows Telco Operators to set network optimization objectives through few lines of code and without requiring expertise in optimization theory or knowledge of network implementation details. By using an abstraction hiding low-level network details, the operating system generates distributed solution programs to be run at individual base stations to collectively and collaboratively optimize the given network objective. The operating system can provide significant performance improvement in (i) network throughput, (ii) energy efficiency, and (iii) user fairness.

The operating system described herein can provide a number of advantages. It can integrate a flexible and dynamic optimization framework with management tools of cellular networks. The operating system provides an infrastructure-oriented system that is not limited to infrastructure-less scenarios (ad hoc networks) with static nodes. It does not require optimized policies and algorithms that must be explicitly programmed and that require expertise in optimization theory.

The operating system can address the interplay between the SDN architecture and that of networks including LTE explicitly. It does not rely on the grouping of multiple base stations into a virtual one, and thus, is suitable to address optimization problems in the dense, flexible and rapidly growing cellular network architecture of modern 5G cellular networks. It can avoid detrimental effects on scalabilty and performance in dense scenarios that can accompany use of a centralized controller coordinating various agents. Optimization is not left to the TO to define rules to match subsets of traffic streams and specifying actions to process them.

The methods and systems described herein can be implemented by and/or as part of a computing system for controlling and operating a software-defined cellular network, for example, by a telecommunications provider. The computing system can be implemented as or can include a computer device(s) that includes a combination of hardware, software, and firmware that allows the computing device to run an applications layer and/or perform various processing tasks. Computing devices can include without limitation personal computers, work stations, servers, laptop computers, tablet computers, mobile devices, wireless devices, smartphones, wearable devices, embedded devices, microprocessor-based devices, microcontroller-based devices, programmable consumer electronics, mini-computers, main frame computers, and the like and combinations thereof.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used, including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include APIs, routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), block random access memory (BRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the systems and methods described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in the systems and methods described herein.

The computing device can include one or more input/output interfaces for connecting input and output devices to various other components of the computing device. Input and output devices can include, without limitation, keyboards, mice, joysticks, microphones, cameras, webcams, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities. Network connection enables the computing device to communicate and interact with any combination of remote devices, remote networks, and remote entities via a communications link. The communications link can be any type of communication link including without limitation a wired or wireless link. For example, the network connection can allow the computing device to communicate with remote devices over a network which can be a wired and/or a wireless network, and which can include any combination of intranet, local area networks (LANs), enterprise-wide networks, medium area networks, wide area networks (WANS), virtual private networks (VPNs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission to and receipt of data via the communications link. A transceiver can include one or more devices that both transmit and receive signals, whether sharing common circuitry, housing, or a circuit boards, or whether distributed over separated circuitry, housings, or circuit boards, and can include a transmitter-receiver.

The computing device can include a browser and a display that allow a user to browse and view pages or other content served by a web server over the communications link. A web server, sever, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), desktop as a services (DaaS), backend as a service (BaaS), test environment as a service (TEaaS), API as a service (APIaaS), and integration platform as a service (IPaaS).

EXAMPLES

OAI-Based Operating System Prototype Implementation

Figure 4:
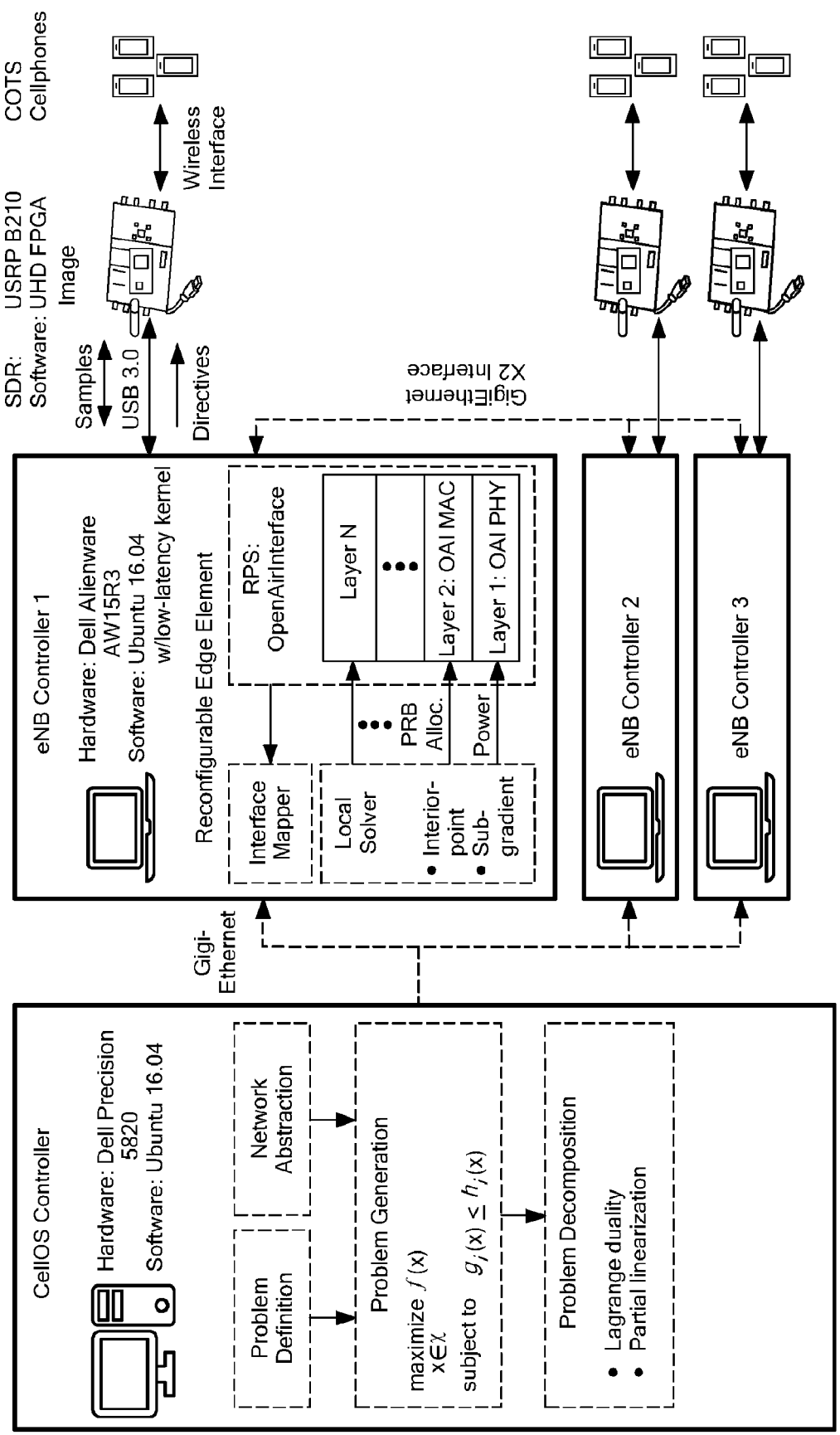
FIG. 4 is a schematic illustration of an operating system prototype.

A working prototype of operating system has been built by implementing the three main components of its architecture as illustrated in FIG. 4. The prototype operating system uses the LTE-compliant OpenAirInterface, which was extended with new features and interfaces to perform PHY- and MAC-layer optimization and to allow integration and communication with the operating system.

The operating system controller (or host controller), running on a dedicated server, performed the functionalities of the Problem Definition APIs and of the Optimization Framework. Particularly, it created and maintained the network abstraction and generated the optimization problem based on the directives from the TO. It also took care of problem decomposition. In these examples and experiments the decomposition process was implemented by using Lagrangian duality theory and decomposition by partial linearization tools.

Multiple eNB controllers, one for each network base station, were connected to the operating system controller through a gigabit Ethernet connection. These controllers used interior-point and sub-gradient algorithms to solve the distributed programs received from the operating system controller, and set the parameters to be used with the RF front-ends they were connected to on a continuous basis. Each of the controllers was connected to an Ettus Research Universal Software Radio Peripheral (USRP) B210 through a USB 3.0 interface. The eNB controllers exchanged samples with the USRPs and sent them signal directives. Each USRP, then, wirelessly communicated with the subscribers it was serving (i.e., the users). The UEs were a set of heterogeneous commercial off-the-shelf (COTS) cellular phones (i.e., Samsung Galaxy S5, S6 and S7 and Apple iphone 6s). These were equipped with programmable SIM cards manufactured by Open Cells.

The operating system prototype used OpenAirInterface (OAI) as the air interface. OAI is the open source software-based experimental platform for LTE implementations. The version used here concerned the Release 10 LTE access network, along with eNBs and Evolved Packet Core (EPC) components, such as Mobility Management Entity (MME), Home Subscriber Server (HSS), Serving Gateway (SGW), Packet Data Network Gateway (PGW). As OAI does not directly allow per-user power control, or optimized PRB allocation-which are requirements of many network control objectives—these experiments extended its functionalities as follows. Power control was obtained by amplitude-modulating the downlink data signal intended for a specific UE, as described in the first reconfiguration example of Section 2.3. PRB allocation was based upon an optimized waterfilling-like fair scheduling algorithm that has low-complexity, thus meeting the strict timing requirements discussed in Section 2.3. According to this scheme, PRBs were allocated only to those UEs whose downlink transmission buffer was not empty.

Experimental Evaluation

The experiments demonstrated the effectiveness of the operating system in creating optimization problems, decomposing them and dispatching them to be executed by network elements on an LTE-compliant testbed. The experimental testbed is described in Section 3.1; the metrics investigated to evaluate the performance of the operating system are described in Section 3.2; and results from several sets of experiments are presented in Section 3.3.

3.1 Network Scenarios and Settings

The operating system prototype described above was used in a testbed composed of 3 eNBs and up to 9 UEs. Particularly, UEs 1, 2 and 3 were connected to eNB1, UEs 4, 5 and 6 to eNB2, and UEs 7, 8 and 9 to eNB3. Each eNB used a 10 MHz channel bandwidth corresponding to 50 PRBs.

Figure 5:
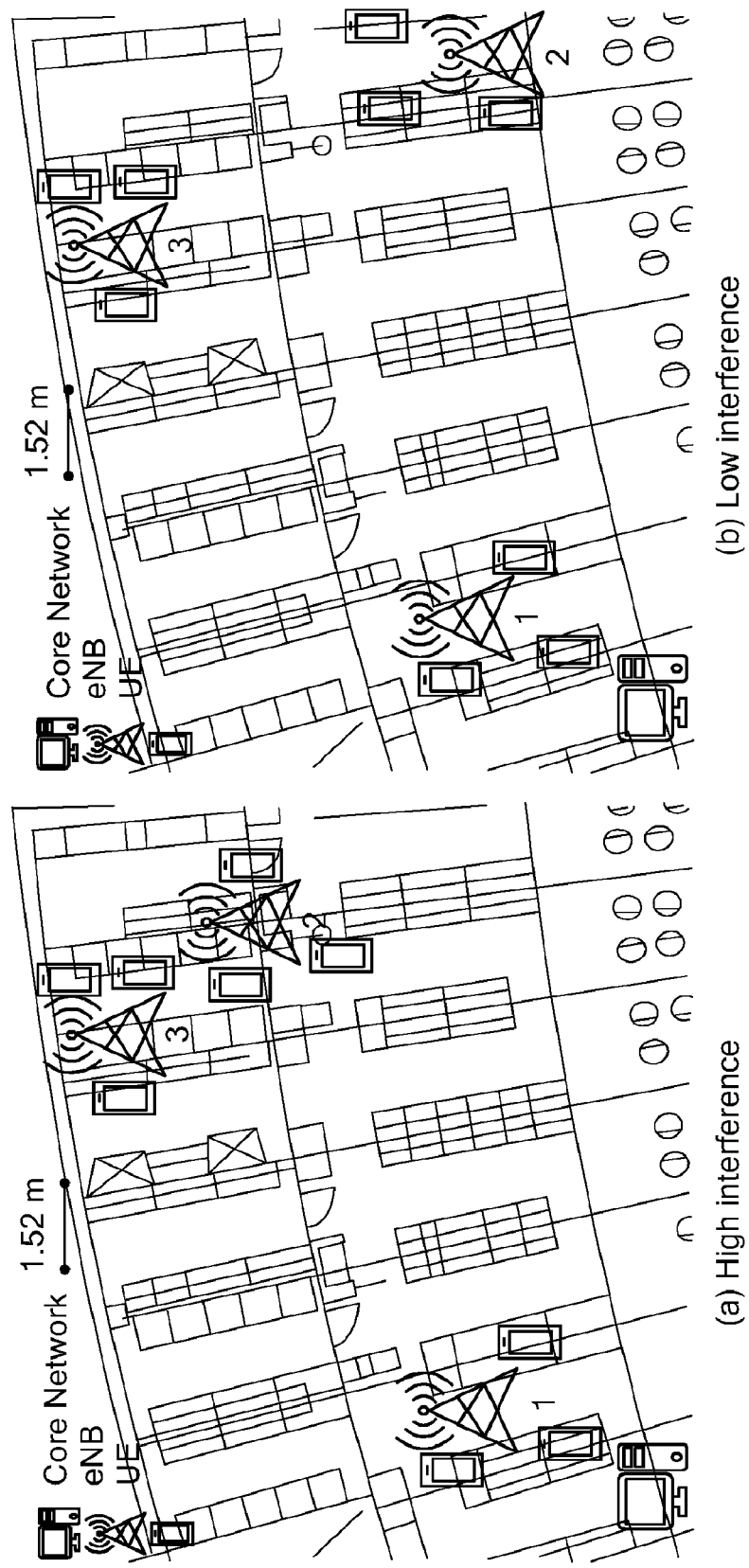
FIG. 5 is a schematic illustration of an operating system testbed illustrating (a) high interference and (b) low interference.

Two indoor scenarios were considered, depicted in FIG. 5. Particularly, experiments were performed in: (i) a high interference scenario with overlapping cells (FIG. 5a), and (ii) a low interference scenario where eNBs were spatially separated from each other (FIG. 5b). In the high interference scenario eNB2 and eNB3 had overlapping coverage areas, while eNB1 was located farther away. This scenario represents those crowded environments (e.g., university campuses, concert halls, or convention centers) where several femtocells are deployed to balance the traffic load of a macrocell farther away from the crowded region. In this case, while the interference among macro- and femtocells was small, femtocells with overlapping coverage areas were subject to significant inter-cell interference. In the low interference scenario, instead, eNBs were located far away from each other. In this case, interference among different eNBs was less severe than in the high interference scenario.

In these experiments, the focus was on downlink performance. UEs were programmed to continuously request data from a server within the local network. This made it possible to (i) avoid uncontrollable network behavior due to unstable and unpredictable Internet connections, and to (ii) collect meaningful statistics and provide a fair comparison between the operating system described herein and other approaches. Particularly, each UE requested data from a file on the server, downloading them for 60 s.

3.2 Performance Metrics

The operating system performance was evaluated against the following metrics: Sum throughput of the network, defined as $$S = \sum_{b \in \mathcal{B}} \sum_{u \in \mathcal{U}_b} S_{b,u}, \forall b \in \mathcal{B}, u \in \mathcal{U}_b$$

where B and $U_b$ were the sets of the base stations b and of the users they were serving, respectively, and $S_{b,u}$ was the throughput offered to UE $u \in U_b$ by its serving eNB b & B.

Normalized transmission power of the base stations to the UEs. If $P_b^{max}$ and $P_b^{min}$ were the maximum and minimum power levels of base station b the normalized transmission power was defined as $$P_{b,u}^N = \frac{P_{b,u} - P_b^{min}}{P_b^{max} - P_b^{min}}, \forall b \in \mathcal{B}, u \in \mathcal{U}_b \quad (12)$$

where $P_{b,u} \in \{P_b^{min}, P_b^{max}\}$ was the power used by eNB $b \in B$ to transmit to its user $u \in U_b$.

The global energy efficiency was defined as the amount of information per unit of energy the base stations transmit to their subscribers $$EE = \frac{\sum_{b \in \mathcal{B}} \sum_{u \in \mathcal{U}_b} S_{b,u}}{\sum_{b \in \mathcal{B}} \sum_{u \in \mathcal{U}_b} P_{b,u}}, \forall b \in \mathcal{B}, u \in \mathcal{U}_b. \quad (13)$$

System fairness was measured through Jain's fairness index. Given the set of users $u \in U = U_{b \in B} U_b$, Jain's fairness index J was defined as $$\mathcal{J} = \frac{\left(\sum_{b \in \mathcal{B}} \sum_{u \in \mathcal{U}_b} S_{b,u}\right)^2}{|\mathcal{U}| \sum_{b \in \mathcal{B}} \sum_{u \in \mathcal{U}_b} S_{b,u}^2}, \forall b \in \mathcal{B}, u \in \mathcal{U}_b \quad (14)$$

Figure 6A:
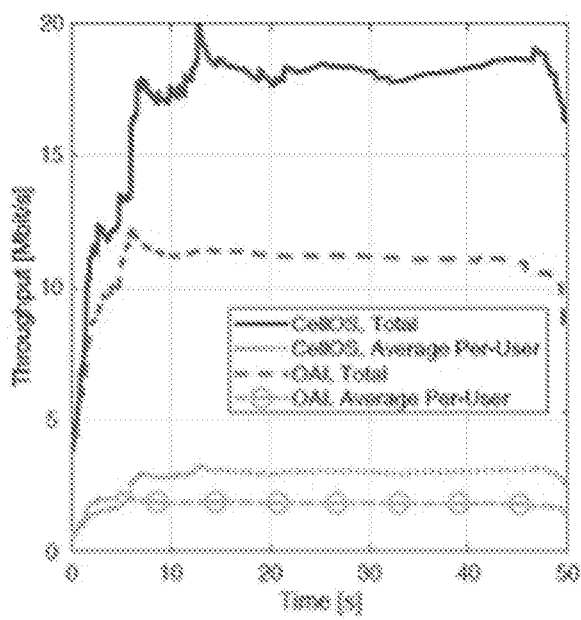
FIG. 6A is a graph of throughput maximization rate in the high interference scenario of throughput vs. time with and without use of the operating system described herein.
Figure 6B:
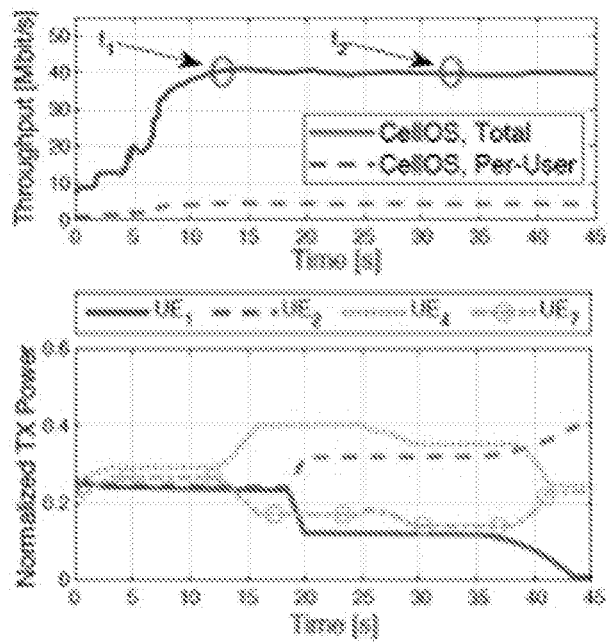
FIG. 6B shows graphs of throughput maximization rate in the high interference scenario of throughput vs. time and power vs. time of use of the operating system described herein.
Figure 6C:
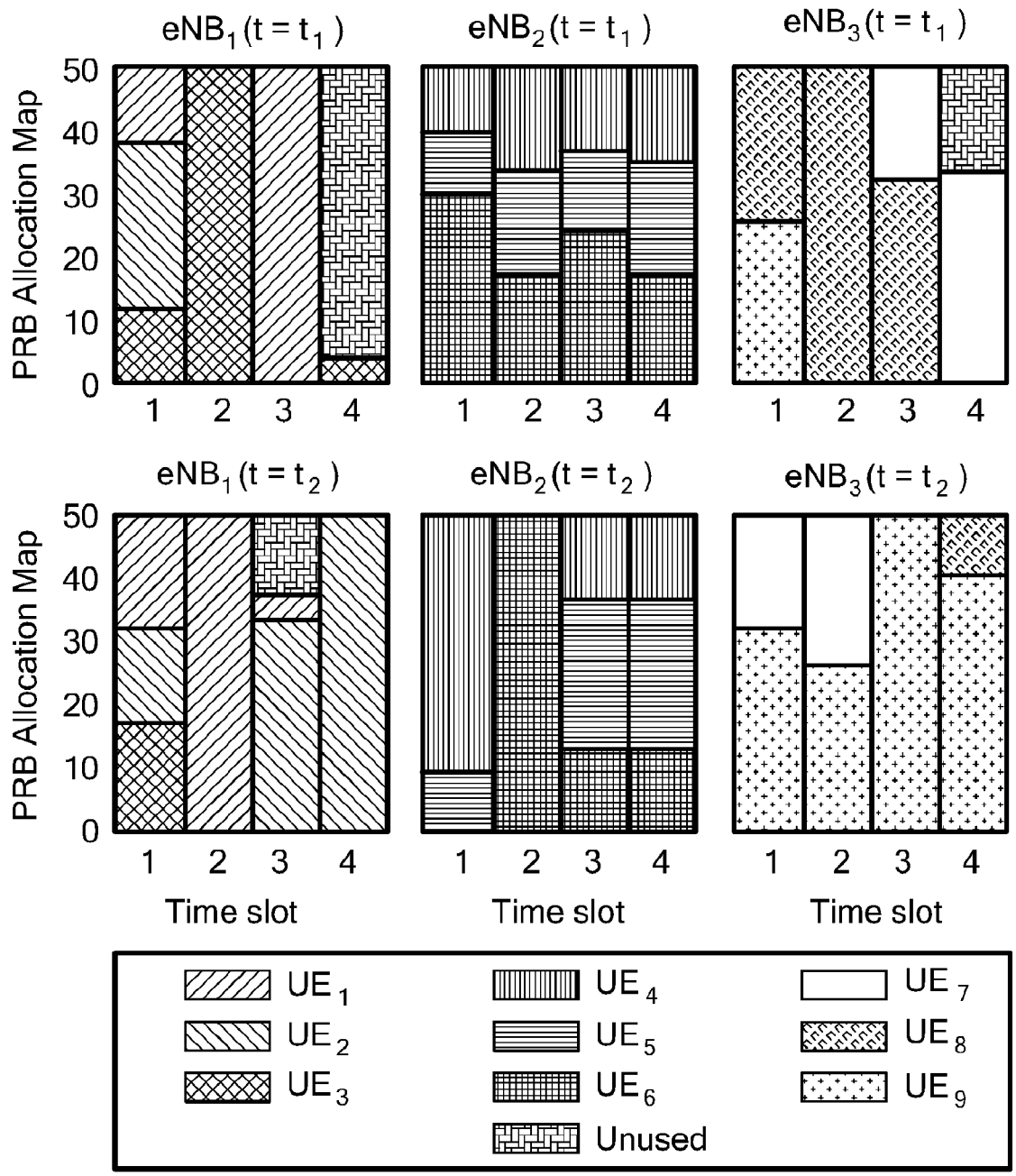
FIG. 6C shows graphs of PRBs at time instants t1 and t2.

3.3 Experimental Results 3.3.1 High Interference Scenario. FIG. 6 illustrates optimizing throughput (network control objective of max (rate)) in a high interference scenario. The throughput obtained by the operating system prototype was compared with that achieved by the baseline OAI. Total (average sum throughput) and average per-user throughput are shown in FIG. 6a. It can be observed that the operating system always outperformed the baseline OAI, with improvements as high as 75%. This was because of the interplay between the optimized per-user power control and scheduling determined by the operating system and executed locally by its softwarized RAN, which was unavailable to baseline OAI. To provide further insights, the network throughput and the corresponding power allocated to the users during a single experiment run of the max (rate) solution program was investigated (for clarity, only the power for four users is shown). Results are shown in FIG. 6b. As time progressed, it was observed that the throughput (both total and per user) plateaued out to a stable value, which was a consequence of local optimality of the solution program that successfully managed and contained interference. Power was changed for the individual user in time, also responding to optimization requirements and reflecting current network conditions. FIG. 6c depicts the PRBs allocated to UEs by their eNBs at time instants $t_1$ and $t_2$ (indicated in FIG. 6b). It was observed that in time, the MAC-layer optimization program of the eNBs adapted the PRB allocation to satisfy user requirements while achieving the set network objective. In fact, time slots with unassigned PRBs might even occur, without compromising the eNB ability of satisfying its subscribers requirements.

Figure 7:
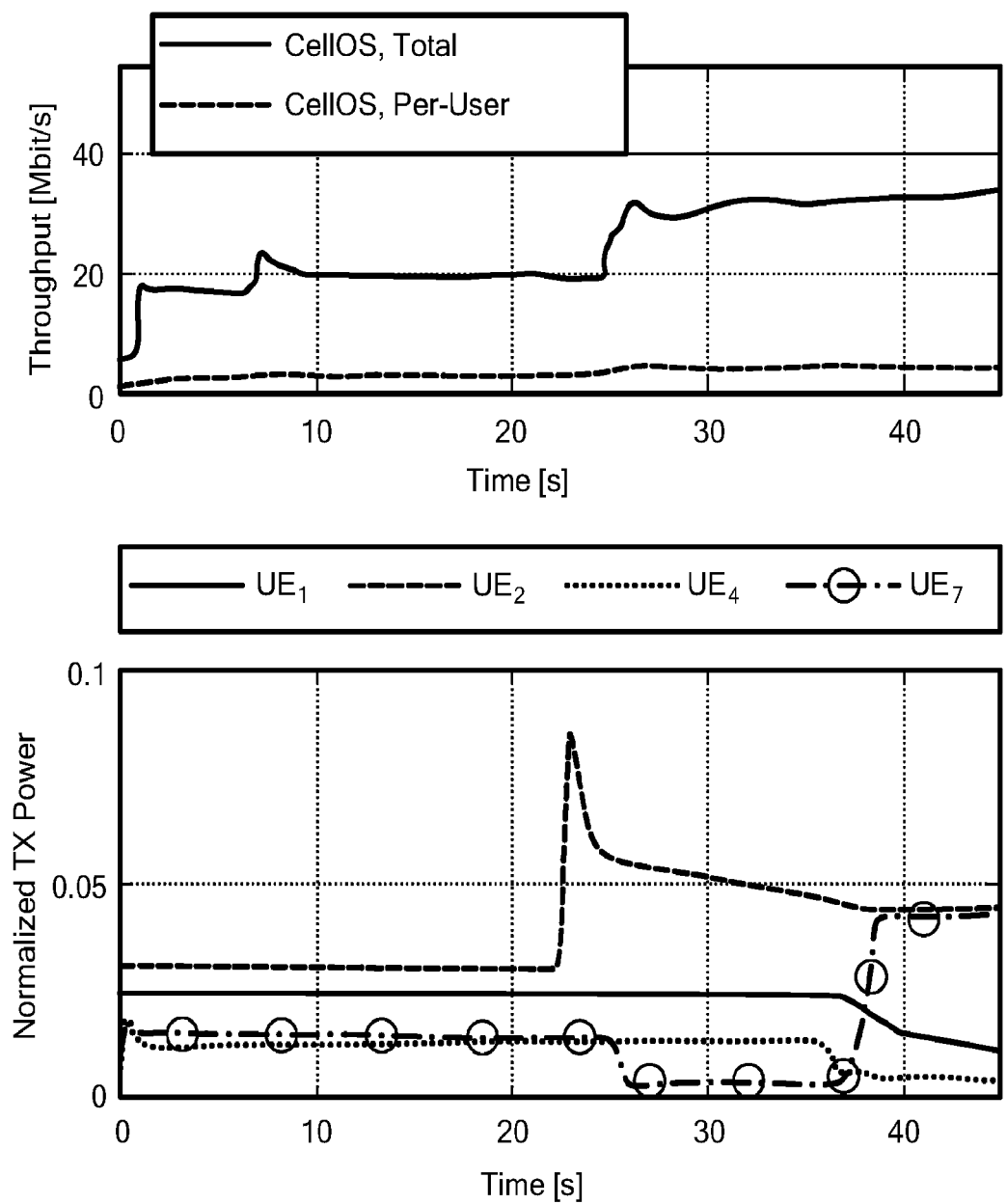
FIG. 7 shows graphs of power minimization in the high interference scenario of throughput vs. time and normalized Tx power vs. time.

To show that different network control objectives produced different results, throughput and power determined by the operating system for power minimization (network control objective of min (power)), while guaranteeing a minimum per-user throughput, was investigated. The results shown in FIG. 7 refer to the same setting of FIG. 6b. As expected, the achieved network throughput was lower than that obtained by solving a max (rate) control program. However, it was observed that the normalized transmission power of the eNBs was remarkably lower than that in the previous example (up to one order of magnitude).

The next set of experiments concerned the performance of the operating system and OAI in scenarios with varying number of eNBs and UEs. The network control objective required to maximize throughput while explicitly accounting for fairness, namely, was set to max (sum (log (rate))); scenarios with one base station considered only eNB3, while scenarios with two base stations included eNB2 and eNB3, namely, the base stations with overlapping cells (FIG. 5a). Results concerning sum throughput, energy efficiency and fairness are shown in FIGS. 8A, 8B, and 8C.

FIG. 8A compares the operating system and baseline QAI on network throughput. The throughout obtained by CellQS was always higher than that of QAI. Gains increased with increasing number of base stations, as optimization techniques were more effective in scenarios with higher interference. Specifically, since in these scenarios suboptimal algorithm solutions generated inefficient resource allocation policies, optimal ones were required the most.

FIG. 8B is an evaluation of energy efficiency. Since the framework achieved a higher throughput with a lower power expenditure, the energy efficiency of the operating system wasb always higher than that of QAI.

Figure 8C:
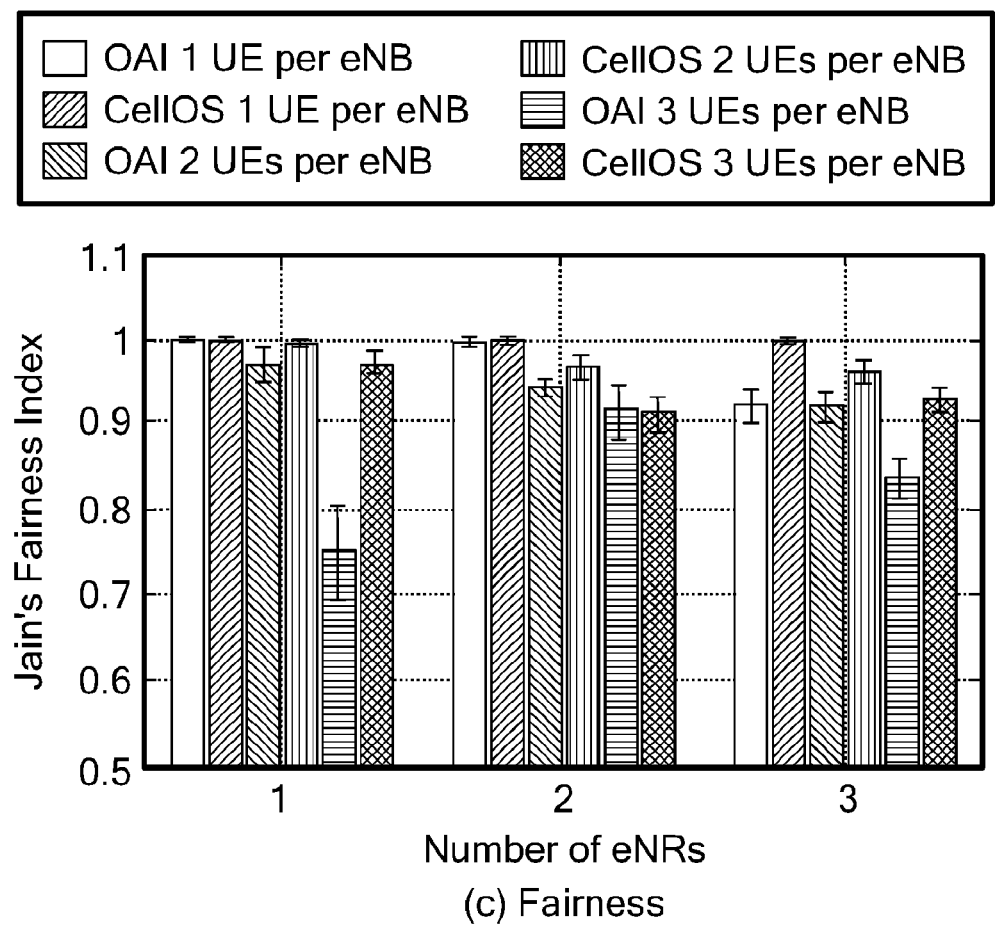

System fairness is depicted in FIG. 8C. Notice that, in general, the operating system improved user fairness with respect to QAI, with increases in fairness up to 29%. Improvements were more evident in scenarios with higher numbers of eNBs and UEs, as optimization techniques were more effective in those more crowded cases.

3.3.2 Low Interference Scenario. This Set of Experiments Concerned 3 eNBs and 9 UEs in Low Interference Conditions (FIG. 5b).

Figure 9:
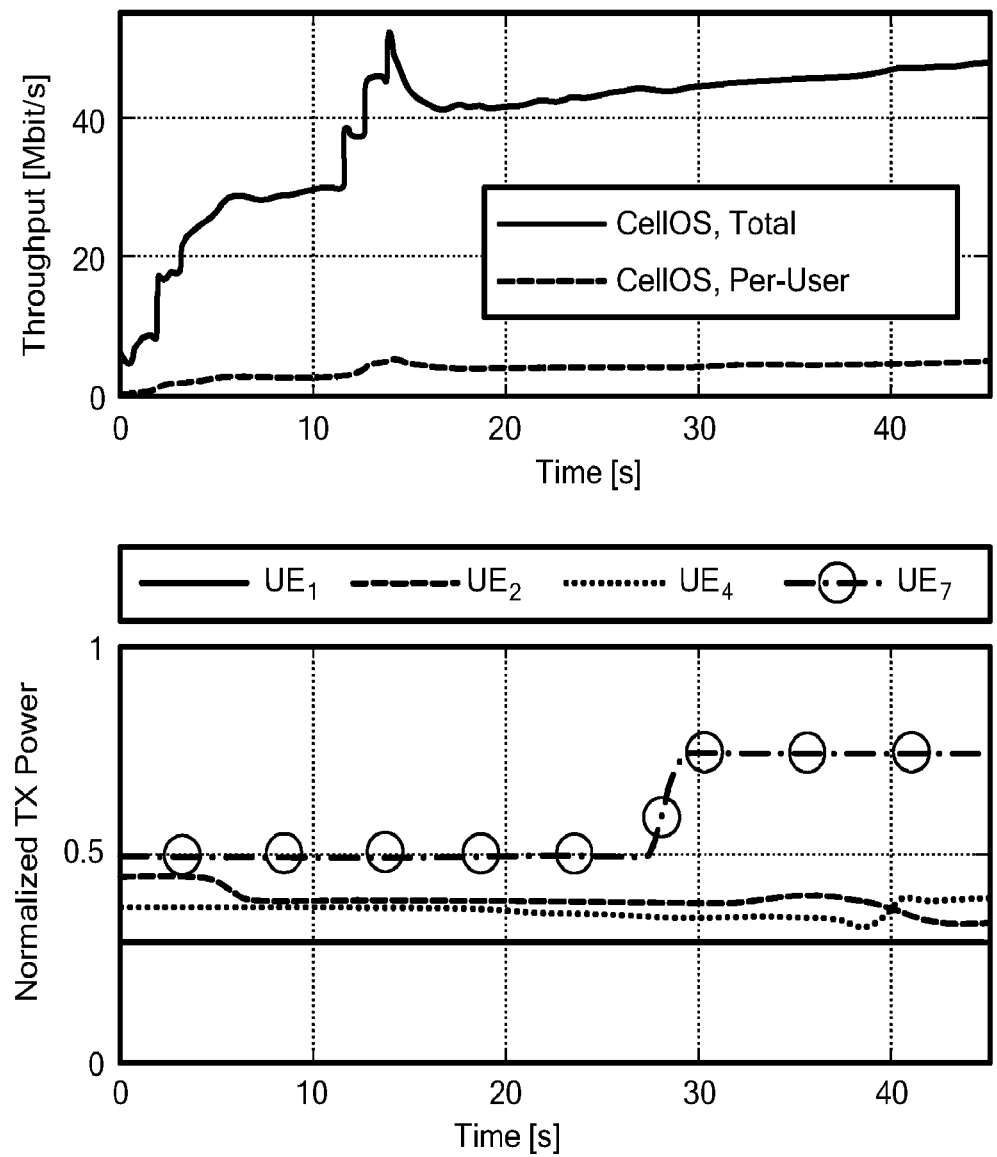
FIG. 9 shows graphs of sum-log-rate maximization in the low interference scenario of throughput vs. time and normalized Tx power vs. time.
Figure 10:
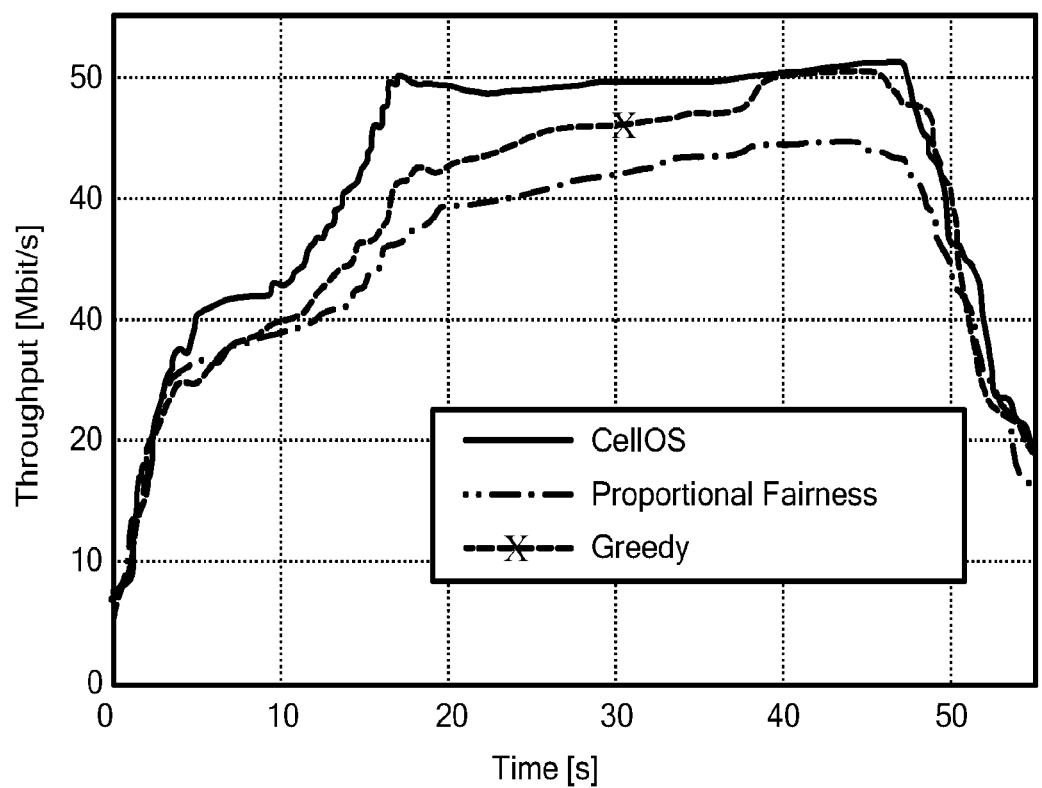
FIG. 10 is a graph comparing throughput vs. time of the operating system of the technology described herein and proportional fairness and greedy scheduling policies in the low interference scenario.

Results on throughput and on the allocated normalized power for a selected subset of subscribers are shown in FIG. 9. In this scenario the operating system was required to optimize the network control objective max(sum(log(rate))). Results were better than those obtained in the high interference scenario (FIG. 8a, rightmost bar), because of the lower interference level. This allowed the eNBs to use higher power without disrupting each other's transmissions. In FIG. 10, the operating system was compared with two well-known scheduling algorithms largely employed in state-of-the-art LTE networks: the proportional fairness algorithm and the greedy one. It can be noticed that CellQS always outperformed the proportional fairness approach because of this overarching optimization approach to network management. The greedy approach, instead, obtained throughput levels similar to those of the operating system, albeit with a significant delay. The operating system, in fact, achieved this throughput level after only a few seconds from system start and maintained it until the UEs finished downloading data.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. An infrastructure-based wireless network comprising:
   a Radio Access Network (RAN) Intelligent Controller (RIC) of the network having an operating system for controlling a plurality of base station nodes of the network for communication with a plurality of user equipments (UEs) in communication with the network, the operating system comprising:
   a system host controller, including one or more processors and memory, the host controller including:
      a network abstraction module operative to create a representation of physical network elements of the network, wherein the physical network elements include the plurality of nodes and the plurality of UEs;
      a problem generation module operative to define a network control problem comprising pairing one or more control objectives and one or more constraints with available ones of the physical network elements;
      a problem decomposition module operative to decompose the network control problem into a set of subproblems associated with selected nodes of the network; and
      a solution program dispatcher module operative to dispatch the subproblems as solution programs to the selected nodes; and
   the infrastructure-based wireless network further comprising the plurality of base station nodes, each node including a reconfigurable edge element having a reconfigurable protocol stack configured to execute a corresponding one or more of the dispatched solution programs using local parameters to control communication between the node and one or more corresponding UEs.

2. The system of claim 1, wherein the network abstraction module is operative to receive one or more objective functions and one or more constraints of the network control problem based on a descriptive input from a user, and to transmit the one or more objective functions and constraints to the problem generation module.

3. The system of claim 1, wherein the network abstraction module is operative to create an abstraction of the network from one or more configuration parameters of the physical network elements of the network, the configuration parameters comprising one or more of an identification of base stations, operational frequency, network slicing policy, power budget, minimum rate guarantee, a number of base stations and a number of UEs.

4. The system of claim 1, wherein the host controller further comprises an application programming interface module operative to receive a user input of an objective function and a constraint and/or one or more network configuration parameters.

5. The system of claim 1, wherein the problem generation module is operative to receive an input comprising a descriptive directive of a control objective and a constraint, and to convert the control objective into a utility maximization or minimization function subject to the constraint.

6. The system of claim 5, wherein the descriptive directive comprises one or more of maximizing throughput, minimizing power, minimizing energy, guaranteeing a minimum data transmission rate, and a physical resource block allocation policy.

7. The system of claim 1, wherein the problem generation module is operative to map the physical network elements into virtual network elements.

8. The system of claim 1, where the problem decomposition module is operative to:
   identify optimization variables of the network control problem;
   assign each variable to a specific base station of the network or to a specific protocol stack layer of the specific base station;
   identify coupled variables;
   remove coupling across the optimization variables; and
   generate objective functions and constraints with separable terms for association with the specific base stations.

9. The system of claim 8, wherein the problem decomposition module is further operative to convert the objective functions into programs for transmission to and executable at the specific base stations using local parameters.

10. The system of claim 8, wherein the problem decomposition module is further operative to partition the network control problem horizontally and/or vertically, wherein horizontal decomposition comprises decoupling variables belonging to different physical network elements, and vertical decomposition comprises decoupling variables from different layers of a protocol stack at each of the different physical network elements.

11. The system of claim 8, wherein the problem decomposition module is further operative to organize the identified coupled variables into a coupling graph in which coupled variables are joined by an edge.

12. The system of claim 8, wherein the problem decomposition module is further operative to decompose the network control problem by a duality technique or a partial linearization technique.

13. The system of claim 8, wherein the problem decomposition module is further operative to decompose the network control problem by introducing auxiliary variables, the auxiliary variables provided by one or more of a Lagrangian multiplier, penalization term, and aggregate interference function.

14. The system of claim 1, wherein the problem decomposition module is operative to provide the solution programs with mathematical expressions containing symbols in place of local parameters for distribution to the nodes.

15. The system of claim 1, wherein the problem decomposition module is operative to convert the subproblems into programs executable at each of the base stations.

16. The system of claim 1, further comprising, at each of the selected nodes, a local controller comprising one or more processors and memory, each local controller operative to receive an associated solution program and execute the associated program to set and adjust local parameters specific to the selected nodes in real time, the local parameters including one or more of transmission power, network slicing policy, user resource allocation policy, user-base station associations, channel coefficients, channel conditions, level of interference, position of users, size of transmission queues.

17. The system of claim 16, wherein the problem decomposition module is operative to convert a control objective into a utility function using symbolic placeholders representative of local parameters specific to the selected nodes.

18. The system of claim 17, wherein the local controller is operative, at run-time, to replace the symbolic placeholders with a current local value.

19. The system of claim 1, wherein the operating system is an app located in an applications layer of the network.

20. The system of claim 1, wherein the network is a LTE network, a 5G network, an open radio access network, or an open network automation platform.

21. A process for controlling a plurality of nodes of an infrastructure-based wireless network for communication with a plurality of user equipments (UEs) in communication with the network, comprising:
providing the infrastructure-based wireless network of claim 1;
receiving at the system host controller a descriptive input comprising one or more control objectives and one or more constraints;
generating a set of subproblems associated with selected nodes of the network;
transmitting each of the subproblems as executable solution programs to associated selected nodes; and
executing, at the selected nodes, the solution programs using local parameters to control the selected nodes for communication with the corresponding UEs.

* * * * *